April 11, 1939.   H. S. MUNCH ET AL   2,154,104
APPARATUS FOR BAKING RADIATOR CORES
Filed Sept. 16, 1936   17 Sheets-Sheet 1

Inventors
Hans S. Munch
Martin G. Boerger

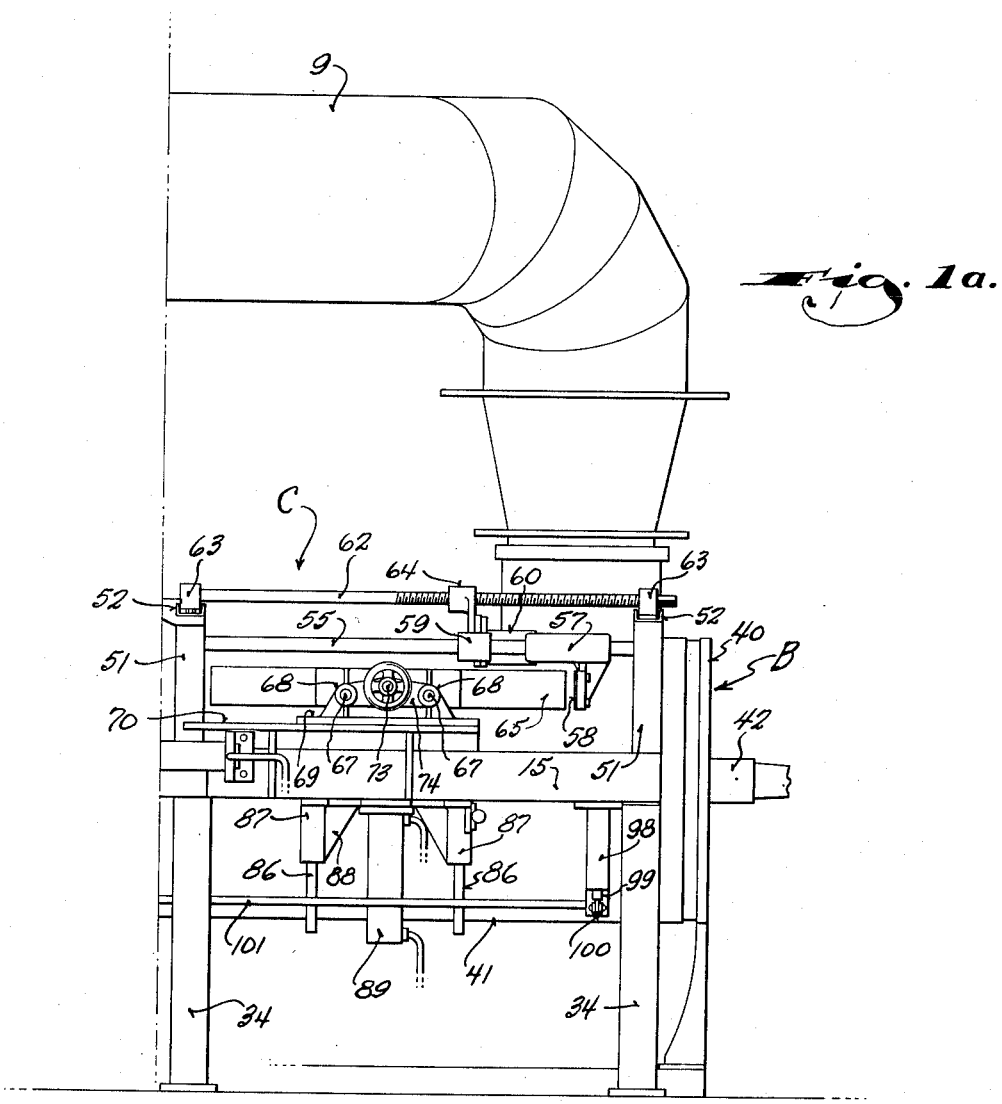

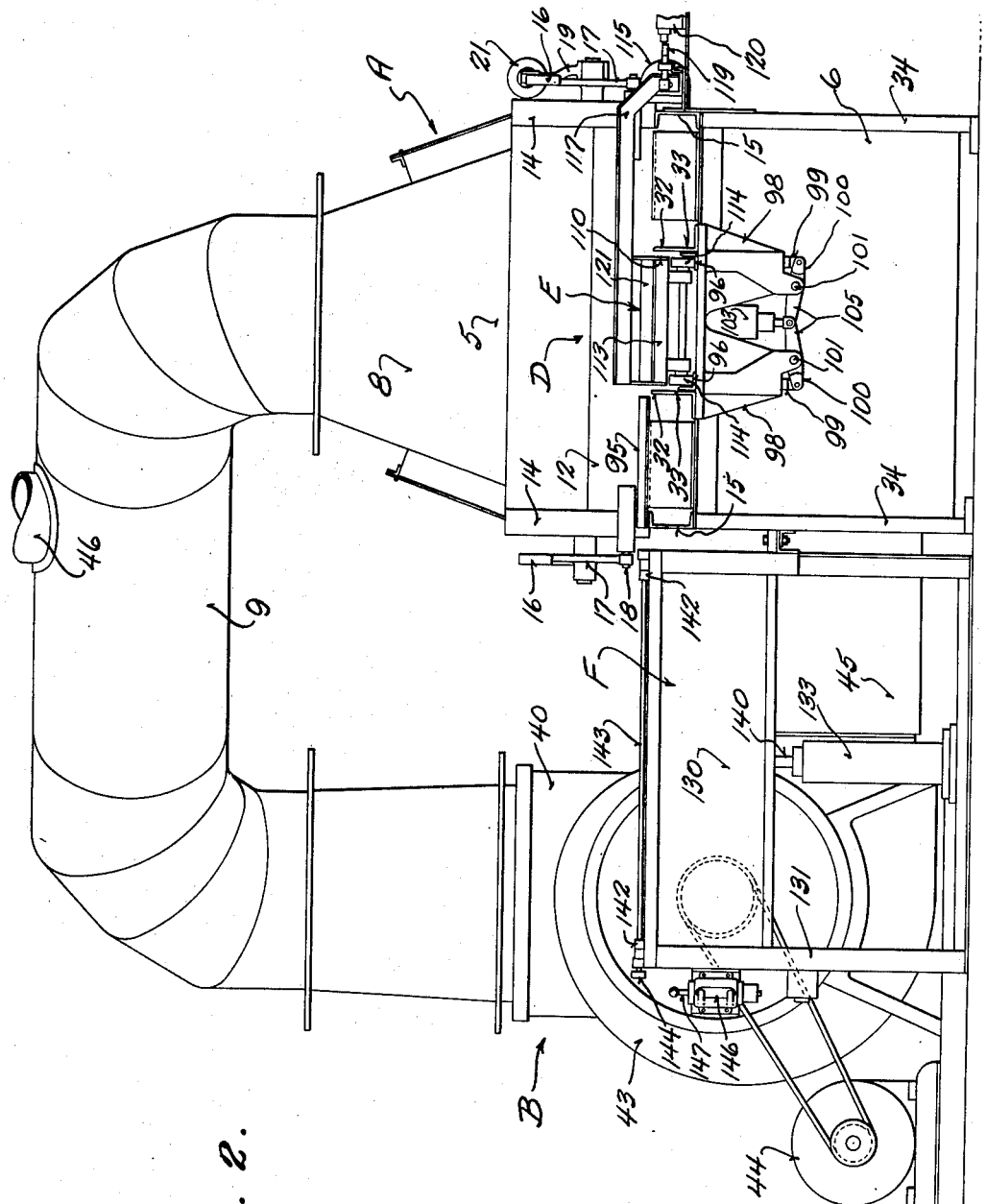

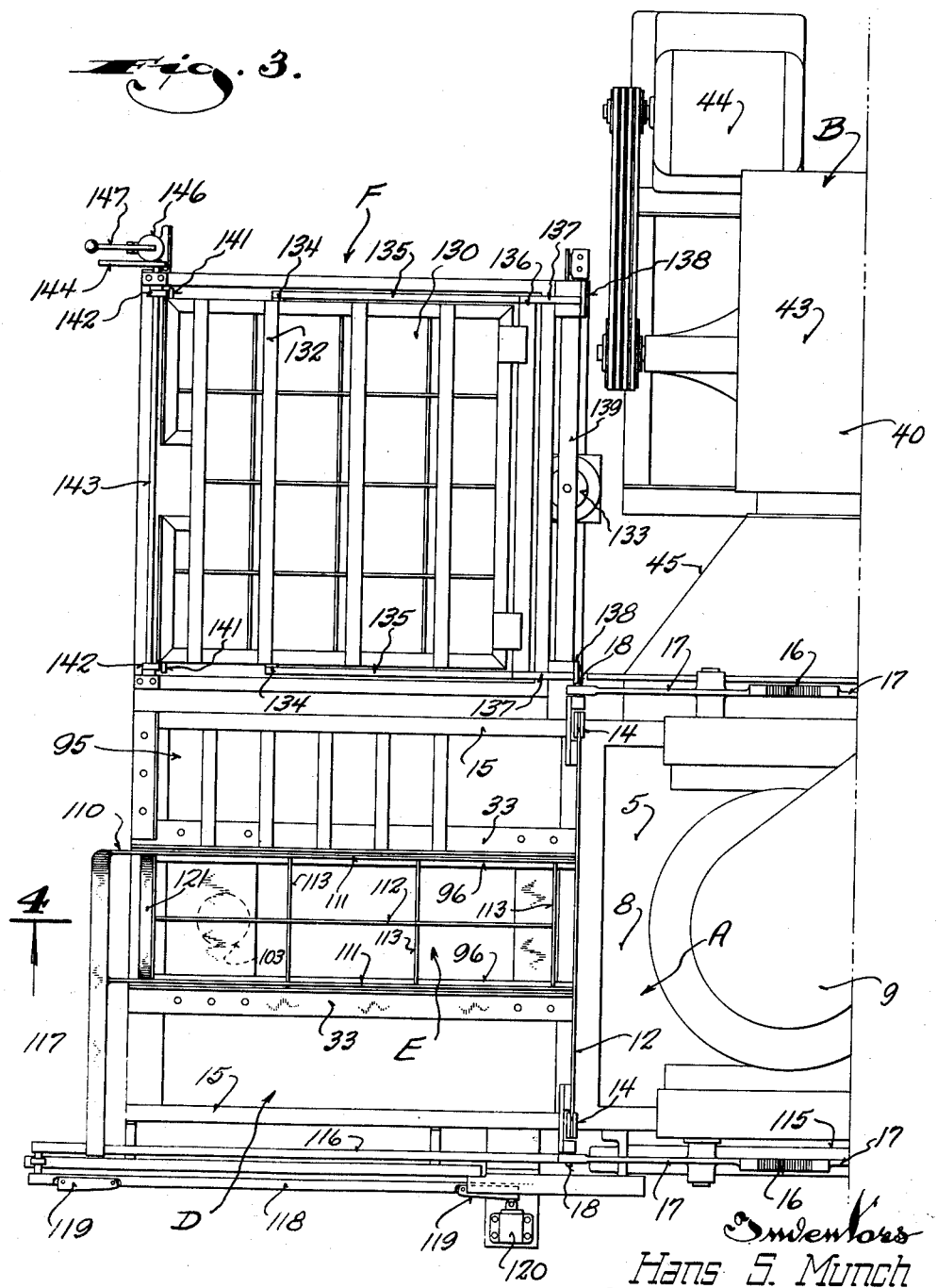

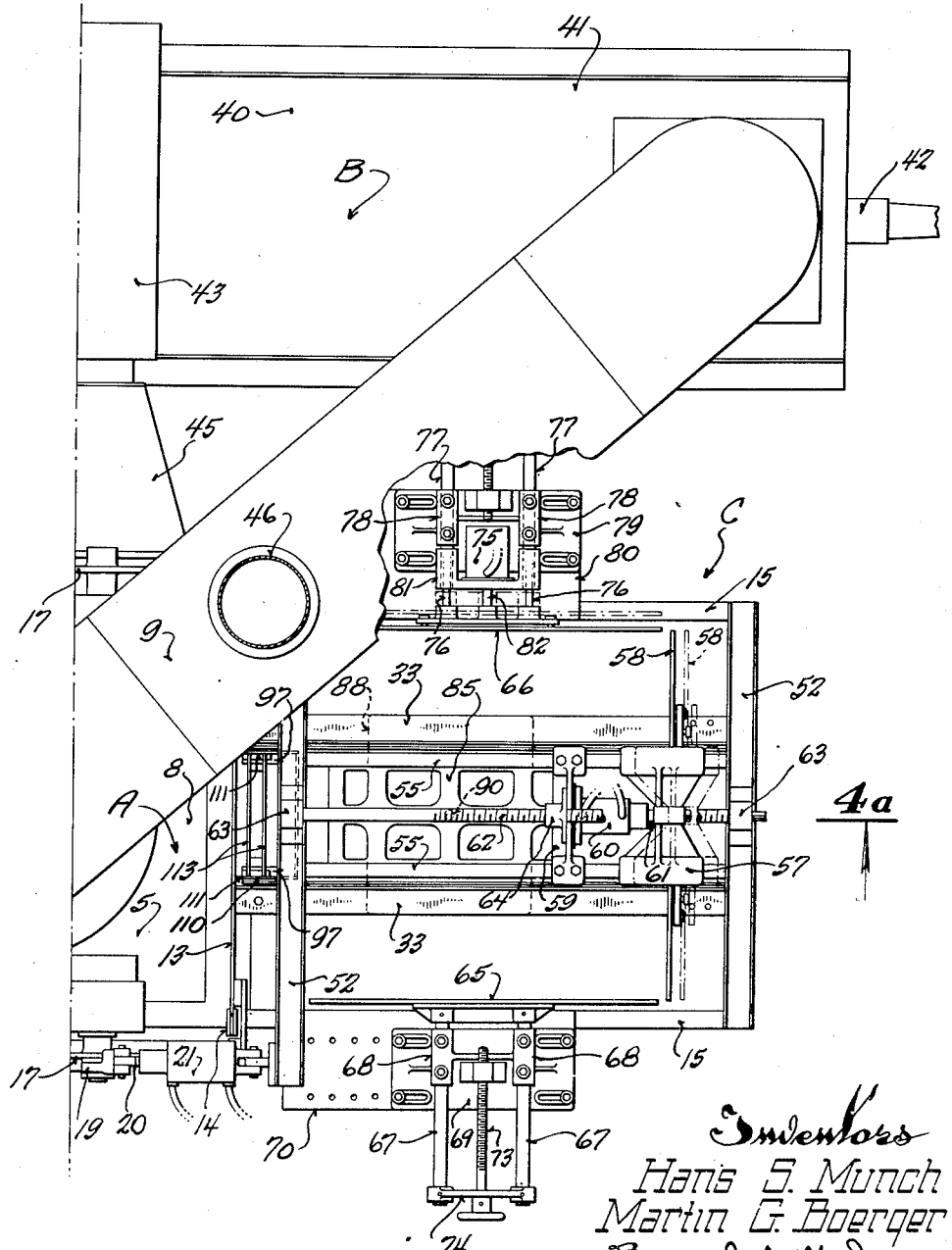

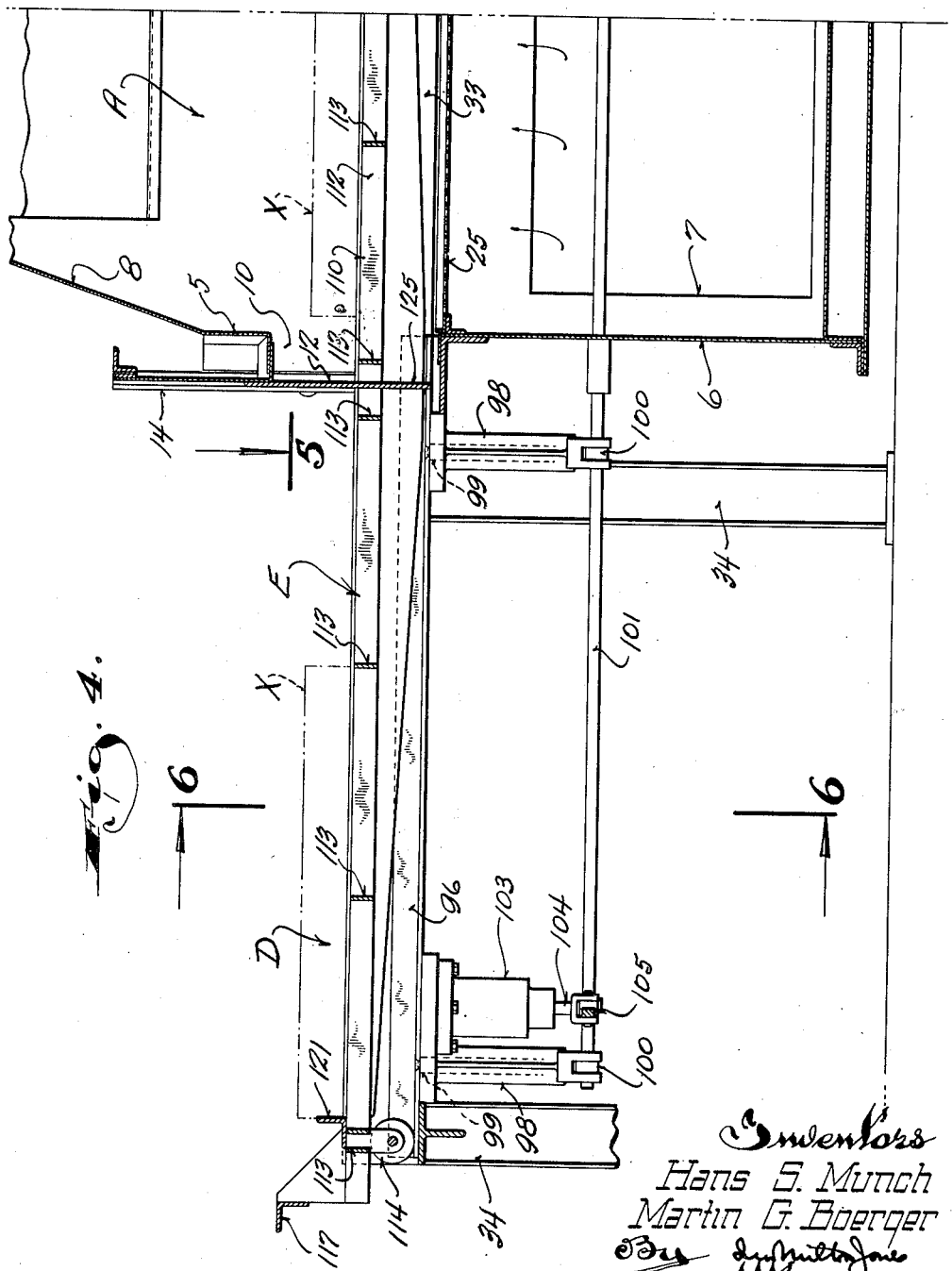

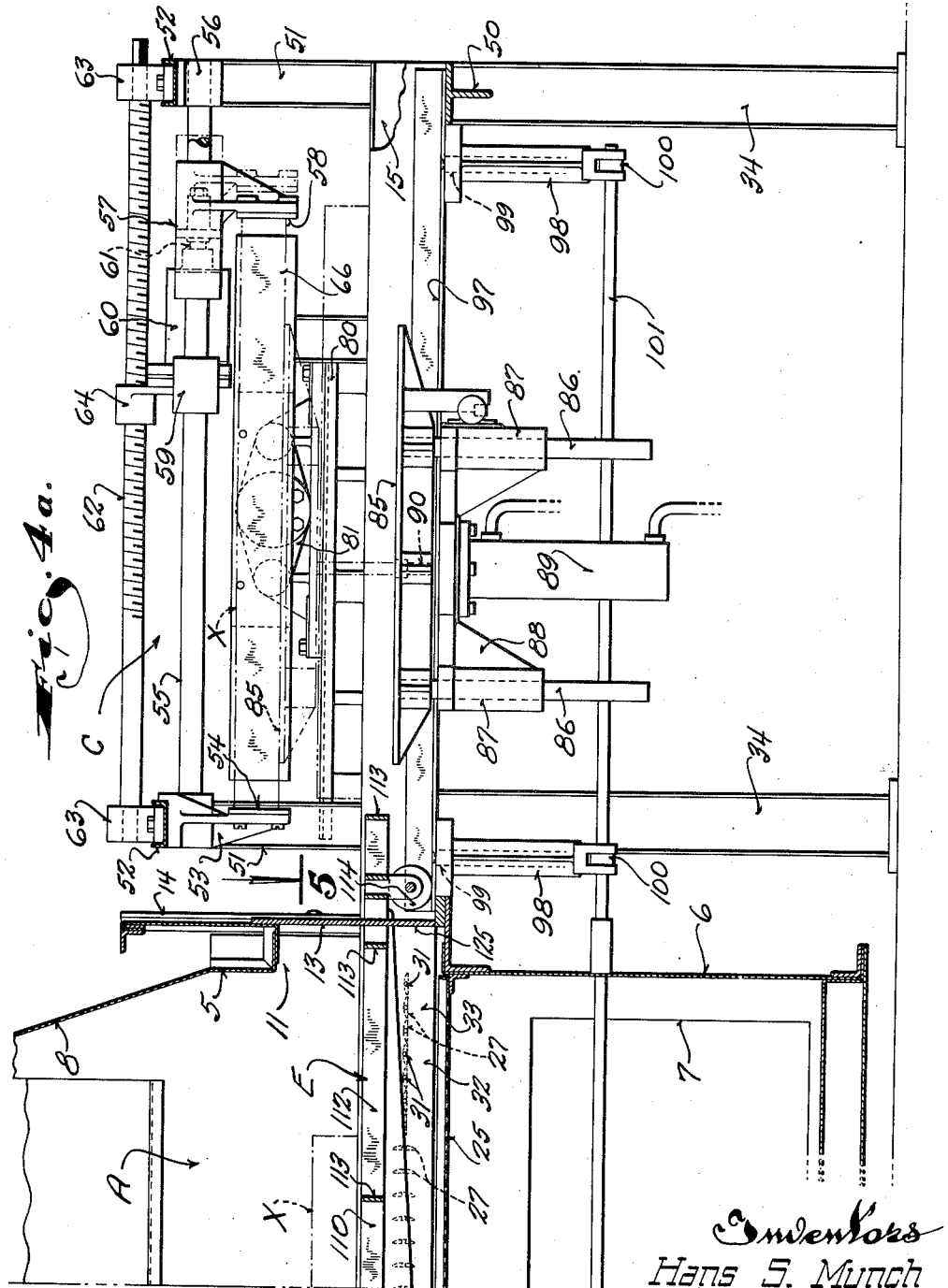

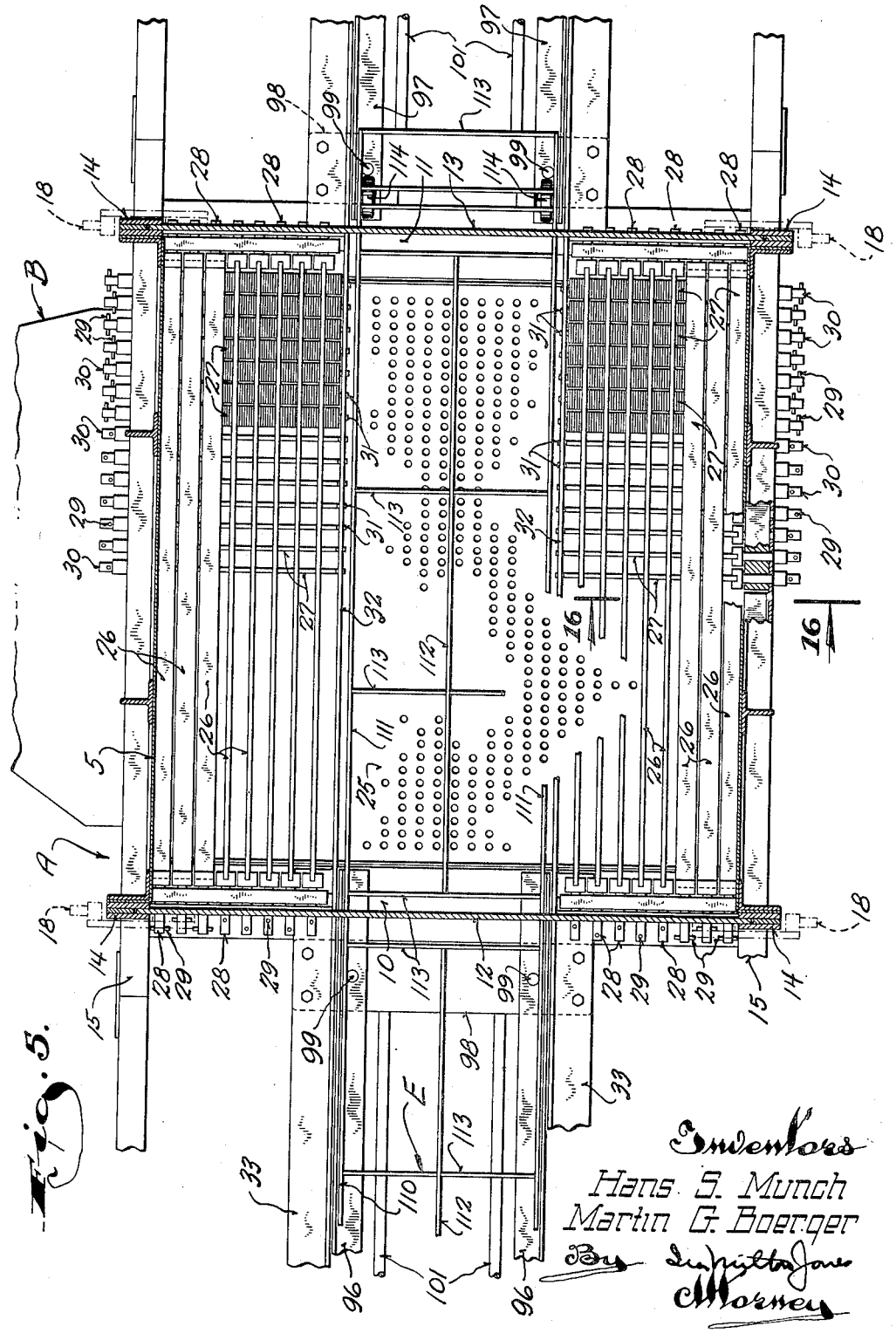

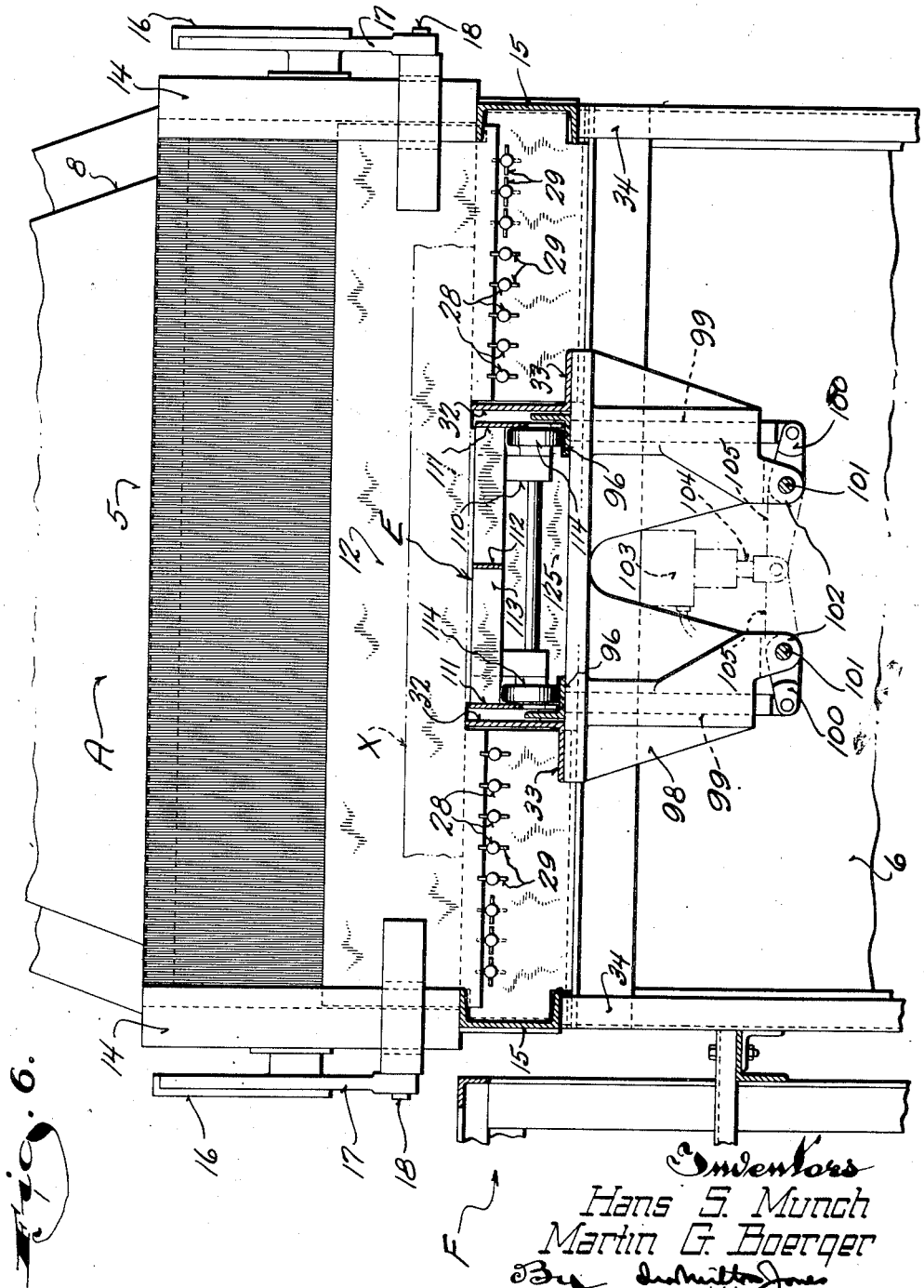

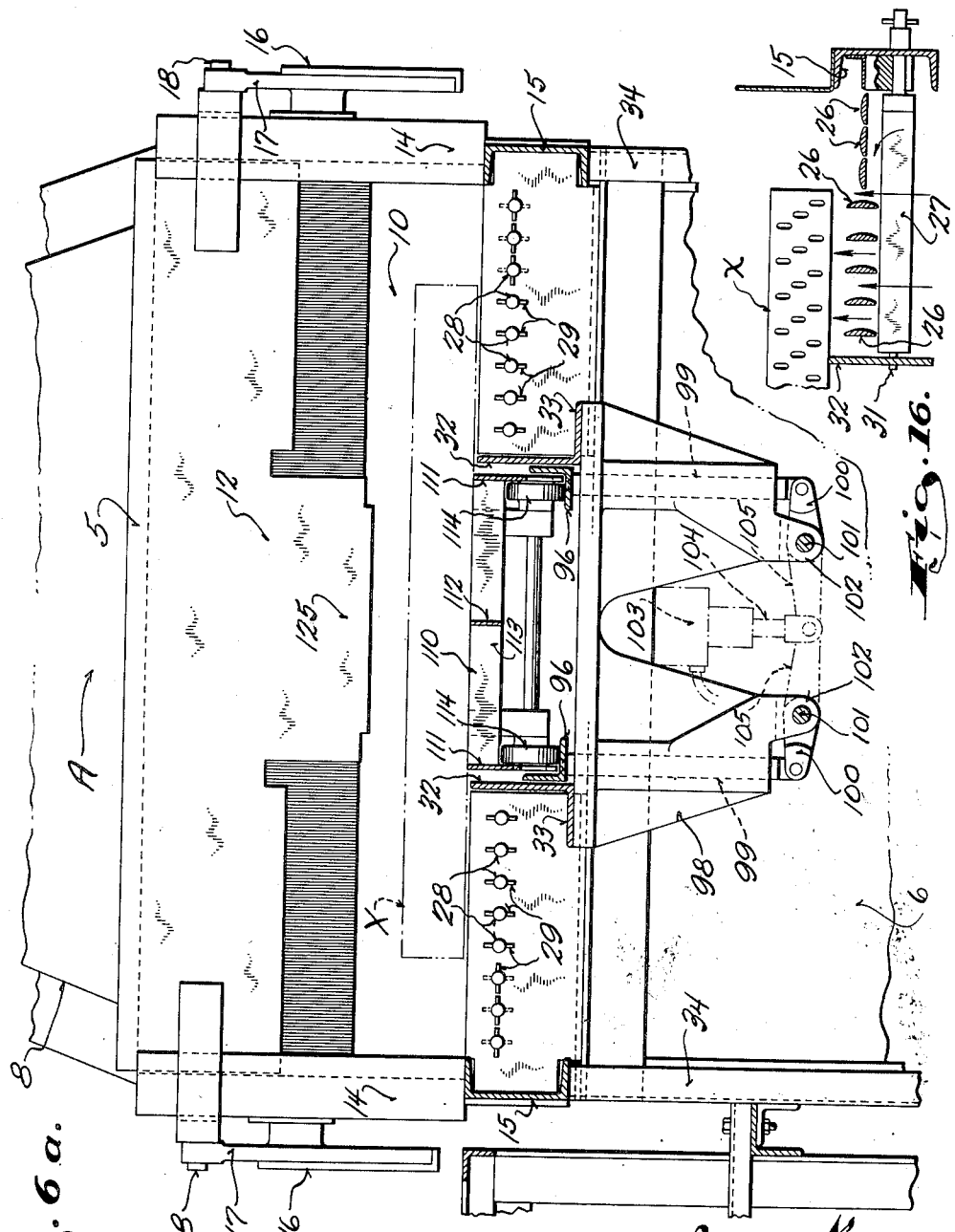

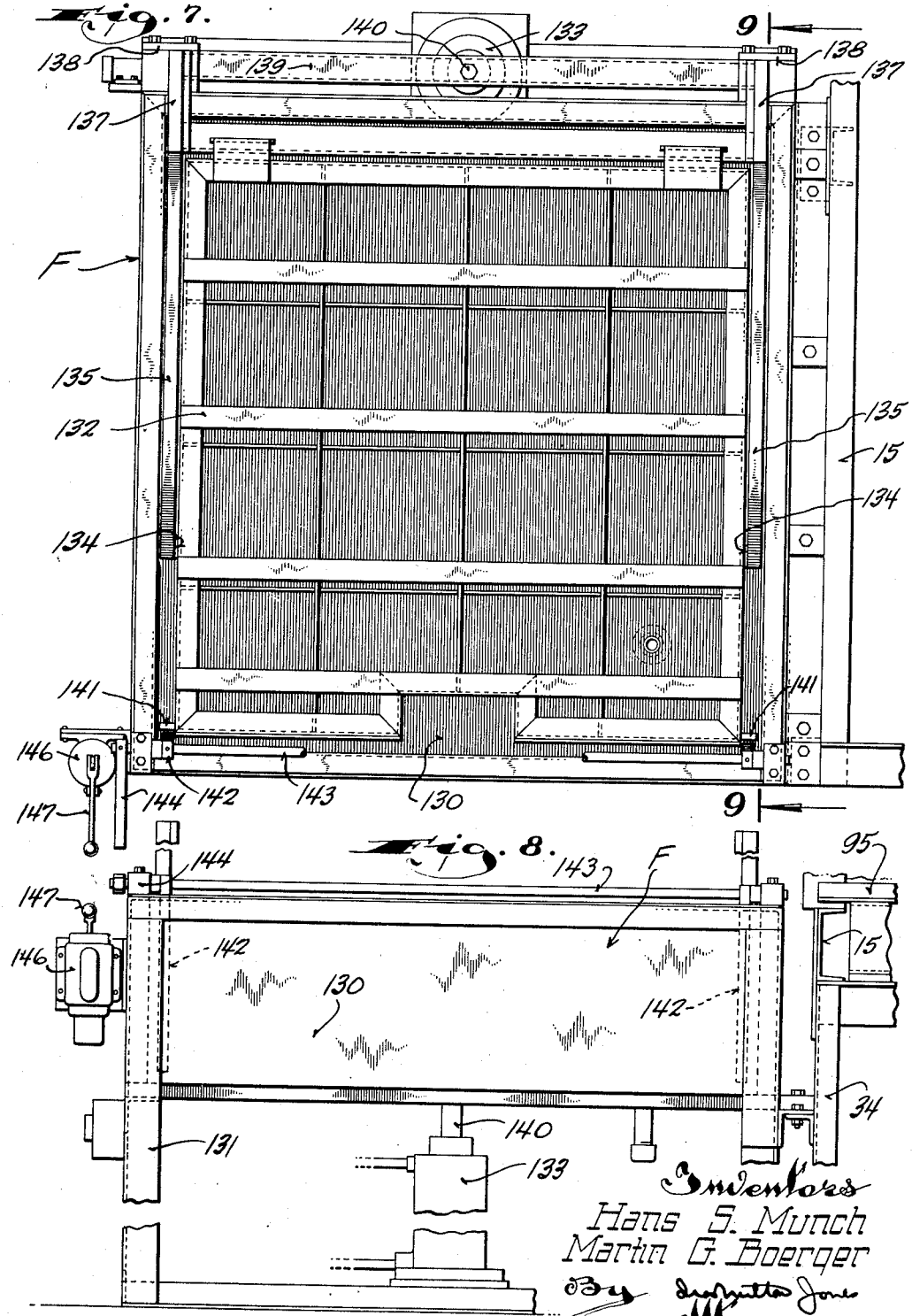

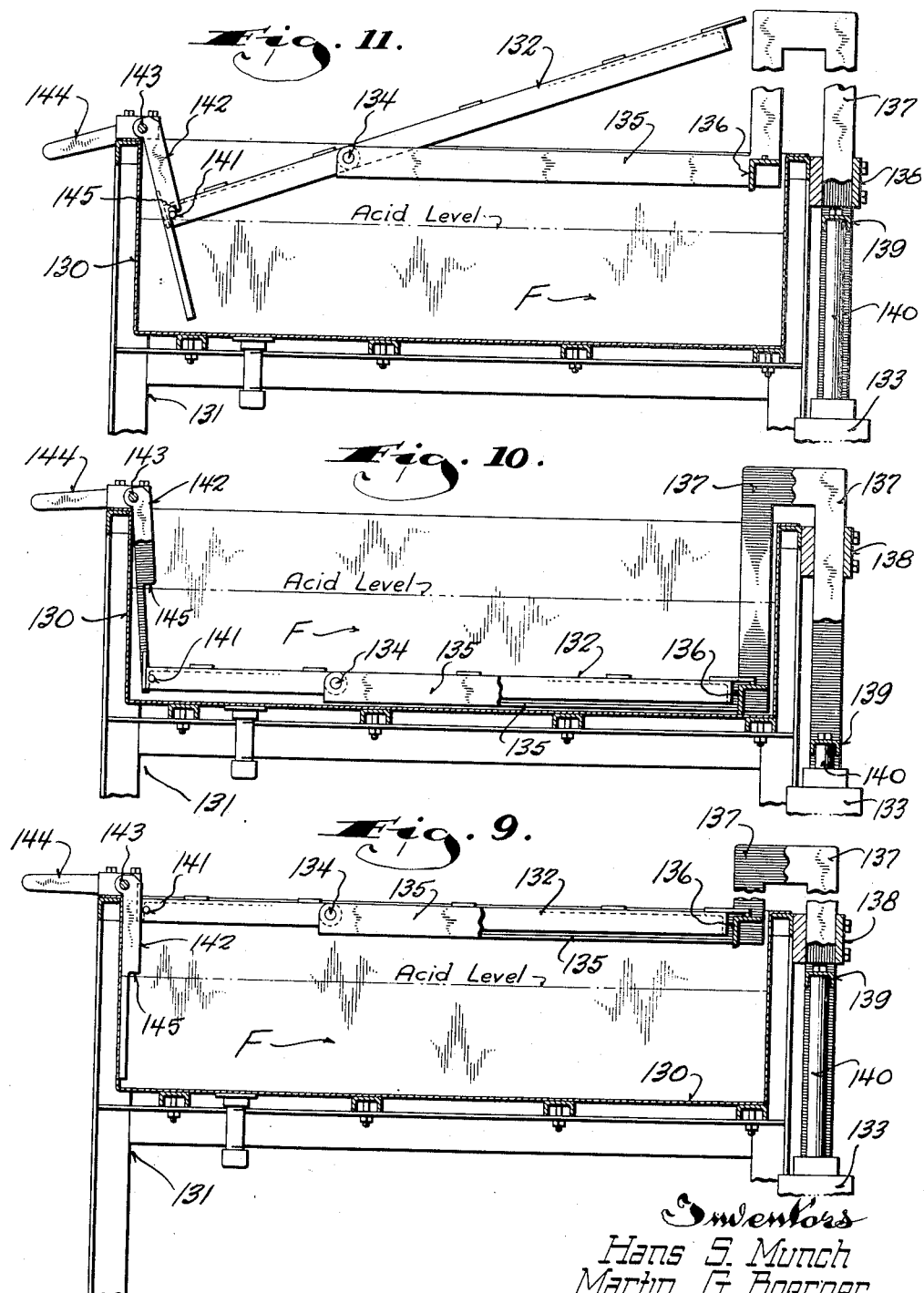

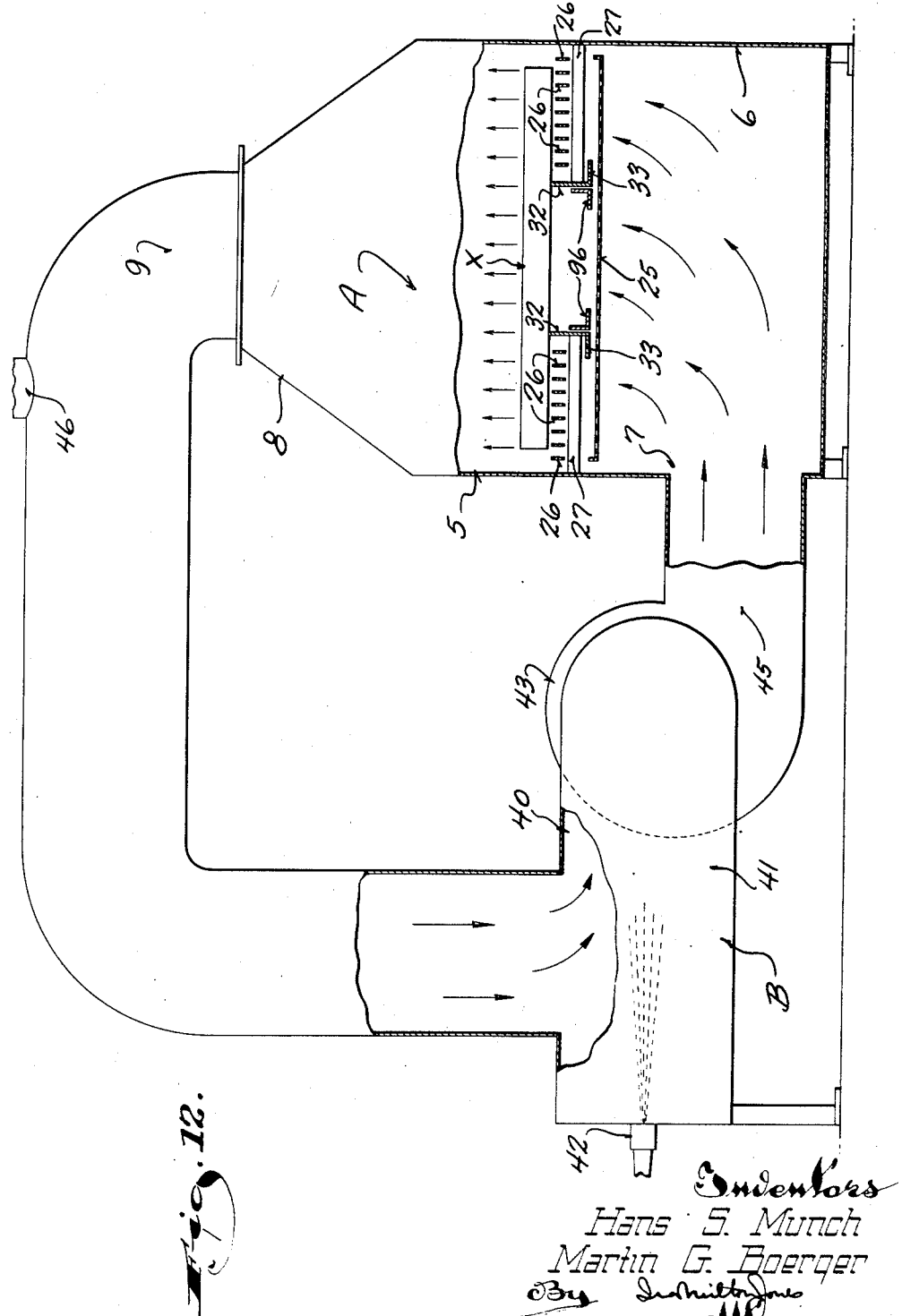

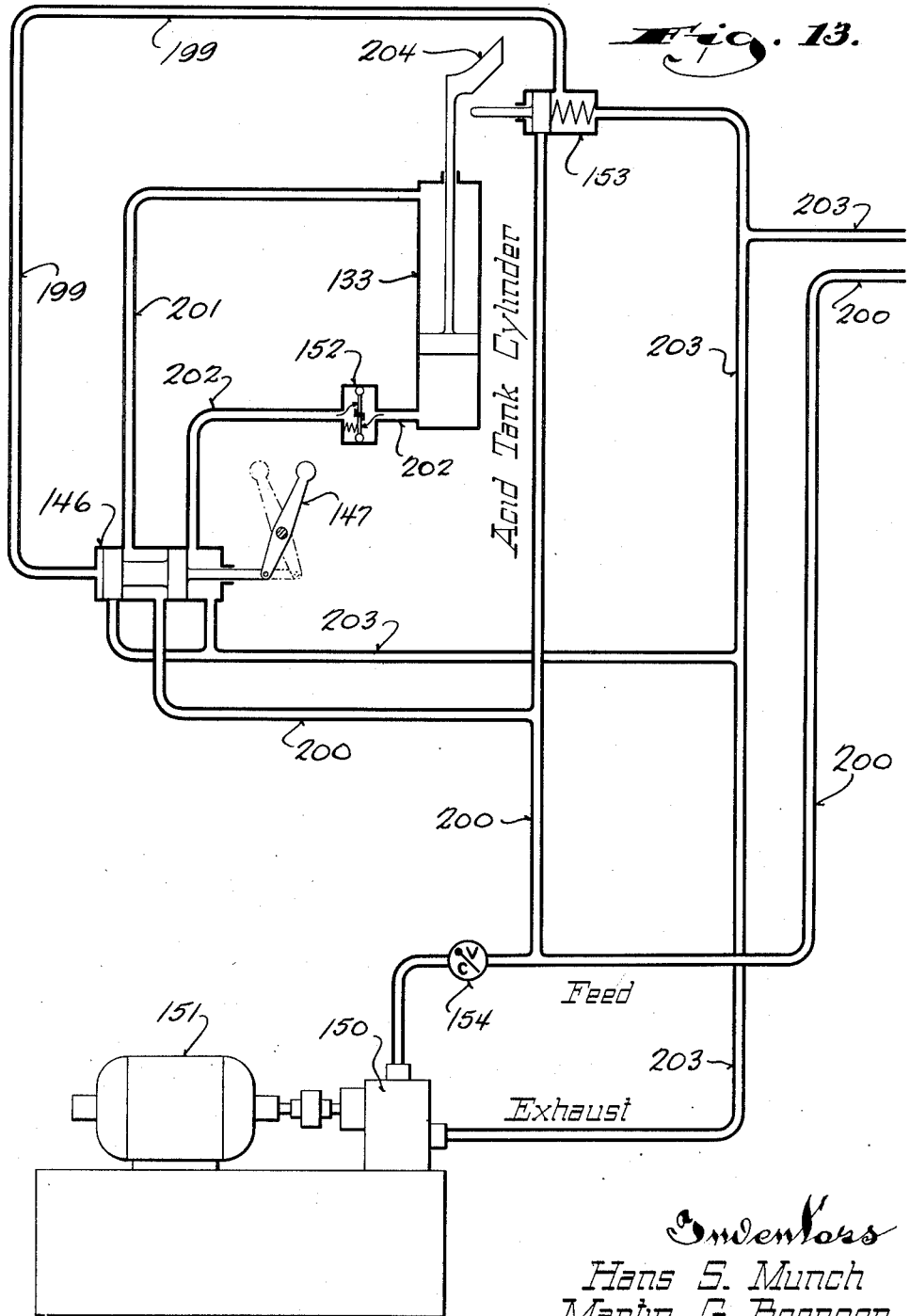

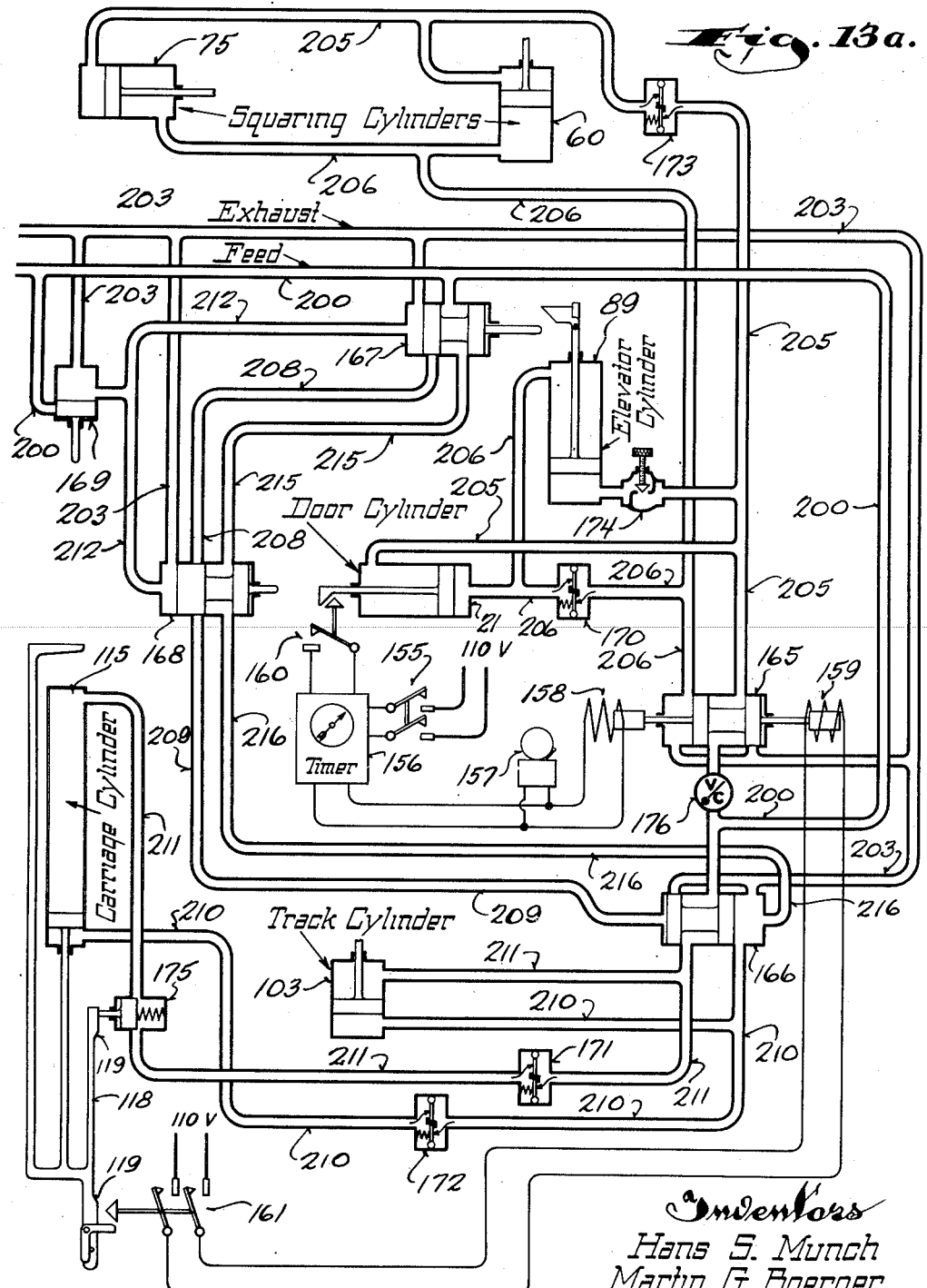

April 11, 1939.    H. S. MUNCH ET AL    2,154,104
APPARATUS FOR BAKING RADIATOR CORES
Filed Sept. 16, 1936    17 Sheets-Sheet 16

Inventors
Hans S. Munch
Martin G. Boerger

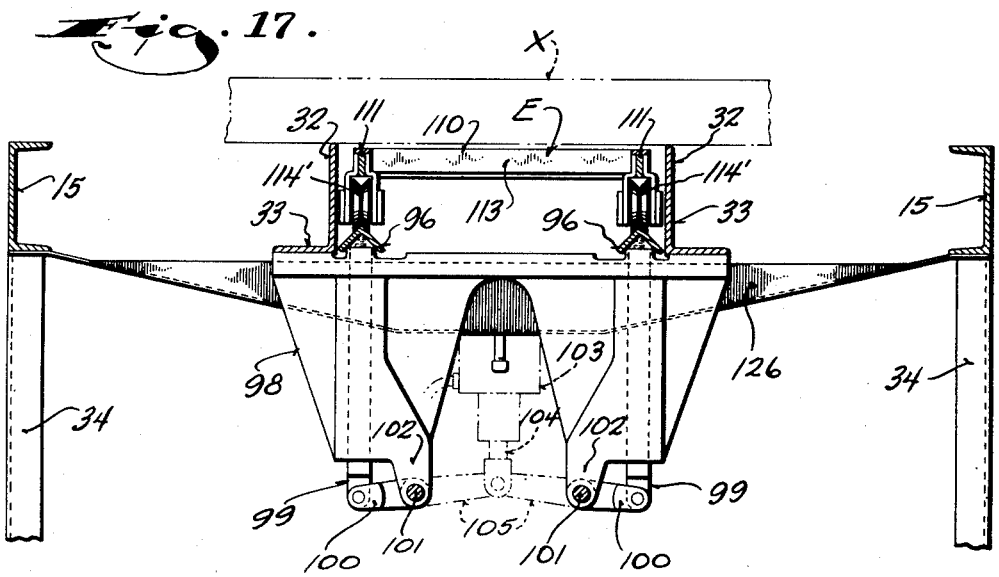
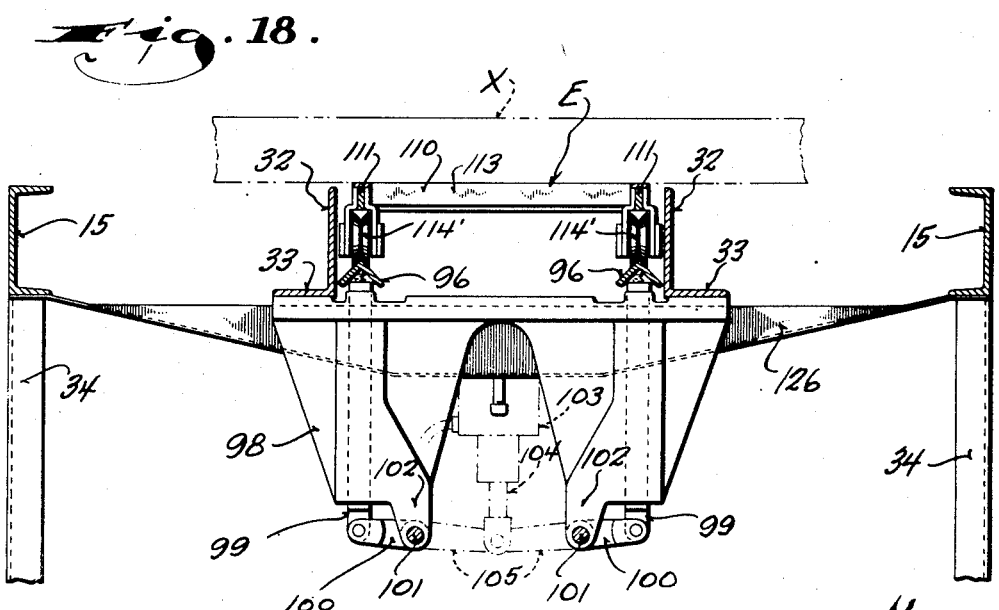

Patented Apr. 11, 1939

2,154,104

UNITED STATES PATENT OFFICE 2,154,104

APPARATUS FOR BAKING RADIATOR CORES

Hans S. Munch and Martin G. Boerger, Racine, Wis., assignors to Modine Manufacturing Company, Racine, Wis., a corporation of Wisconsin Application September 16, 1936, Serial No. 101,102

13 Claims. (Cl. 113—59)

This invention relates to the manufacture of radiator cores which consist of a multiplicity of thin-walled tubes having a multiplicity of spaced thin metal fins attached thereto, and refers particularly to apparatus for soldering the fins to the tubes.

Prior to assembly of the tubes and fins, the tubes are thoroughly tinned with solder. The fins have apertures to snugly receive the tubes so that the peripheral edges of the apertures lie in close contact with the outer walls of the tubes. The securement between the fins and tubes is effected by first dipping the core into an acid bath to provide the flux which enables solder to adhere to the untinned fins, and then the entire core is subjected to a heat treatment high enough to melt the solder on the tubes and cause it to run onto the adjacent portions of the fins.

Broadly, this method of assembling radiator cores has been practiced in the past, but the means heretofore provided for carrying it out were unsatisfactory. It was difficult, and in most instances impossible, to attain any degree of uniformity in the application of the heat to the radiator core. Some portions of the core were subjected to greater heat than others, and as a consequence, the metal of which the fins are composed, which is generally copper, was annealed at these portions of high heat application resulting in the lowering of the quality of the product.

Also, with the apparatus heretofore available, the core had to be subjected to the heat for a period longer than practicable and even with the best results, all of the joints were not properly secured throughout their entirety. This possibility of improper and insufficient juncture between the tubes and the fins results not only in poor heat conductivity between the walls of the tubes and the fins, but also is invariably followed by break-down of the core due to the breathing action on the part of the tube walls in harmony with the pulsations of the engine pump where the radiator is used on an internal combustion engine.

Recognizing these dificiencies of the means heretofore available for soldering radiator cores, this invention contemplates as one of its objects to provide an apparatus whereby a secure bond is assured between the tubes and fins of a radiator core in the shortest possible time and in the most uniform manner.

The heat is produced by a baking oven. Baking ovens heretofore utilized for soldering radiator cores were of the radiant type. With such ovens uniform heat distribution over the entire structure of the core could not be practically obtained as it would entail having the core in the oven so long that the tubes and fins would be annealed and the solder bond oxidized, an as a consequence, the core would be spoiled.

This invention therefore proceeds on an entirely different principle by utilizing a baking oven of the convector type wherein heated gases are caused to circulate through the oven and through the core deposited therein.

It is a particular object of this invention to provide an oven of this type especially designed for baking radiator cores and having means to diffuse or distribute the heated gases so as to insure uniformity of heat application through all portions of the core.

Another object of this invention resides in the provision of means for simultaneously carrying an unbaked core into the oven and removing a baked core from the oven so as to permit production methods of manufacture.

Inasmuch as all radiator cores are not of like dimensions and as the unit is designed to handle comparatively large cores, to insure efficiency when smaller cores are handled, it is a further object of the invention to provide means for restricting the flow of heated gases through the oven to an area corresponding to that of the cores.

More specifically it is an object of this invention to provide a series of adjustable baffles or shutters arranged at right angles to each other through the closure of which the open area afforded for the passage of heated gases through the oven may be adjusted.

Another object of this invention is to provide doors for closing the inlet and outlet of the oven and to provide means for automatically opening and closing the same in coordination with the functioning of the conveyer which carries the cores into and removes them from the oven.

Another object of this invention resides in the provision of means for squaring the core immediately upon its removal from the oven so that any slight relative motion between the tubes and fins necessary for straightening and squaring the core takes place before the solder has set.

It is also an object of this invention to have the means which carries the cores into the oven and removes them from the oven present them directly to the squaring mechanism so that no manual handling of the core is necessary between the baking operation and the squaring operation.

Another object of this invention resides in the provision of means for automatically dipping a core into an acid bath and positioning it for ready application to the carrier by which it is conveyed into the oven.

Another object of this invention is to provide an acid bath of improved and novel construction for immersing the core into the bath and shaking excess acid therefrom.

It is also an important object of this invention to provide a control system for the operation of the entire apparatus so that all of the various instrumentalities function automatically in proper coordinated relationship and sequence, thus reducing manual attention to a minimum and entirely eliminating all possibility of variations which might result where the human element must be taken into account.

In this connection, it is a further object of the invention to provide a combined hydraulic and electrical control system for the functioning of the apparatus.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figures 1 and 1a together comprise a side view of the apparatus;

Figure 2 is a front view;

Figures 3 and 3a together form a top view of the entire apparatus;

Figures 4 and 4a together form a section view through Figures 3 and 3a on the plane of the line 4—4a;

Figure 5 is a horizontal section view taken through Figures 4 and 4a on the plane of the line 5—5;

Figure 6 is a cross section view taken through Figure 4 on the plane of the line 6—6;

Figure 6a is a view similar to Figure 6, but showing the parts in another position;

Figure 7 is a top plan view of the acid dip bath;

Figure 8 is a front view thereof;

Figure 9 is a section view through Figure 7 on the plane of the line 9—9;

Figures 10 and 11 are section views similar to Figure 9, but showing the parts in different positions;

Figure 12 is a diagrammatic showing of the circulatory heating system;

Figure 14:
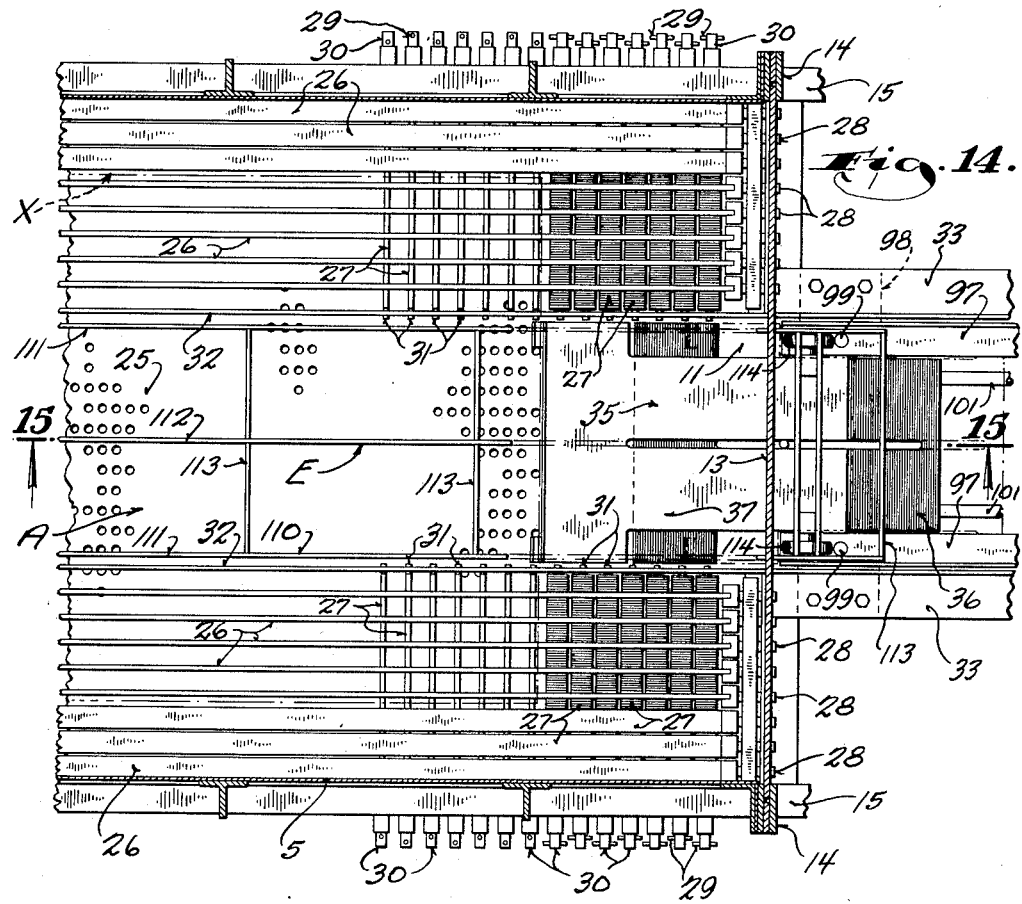
Figure 15:
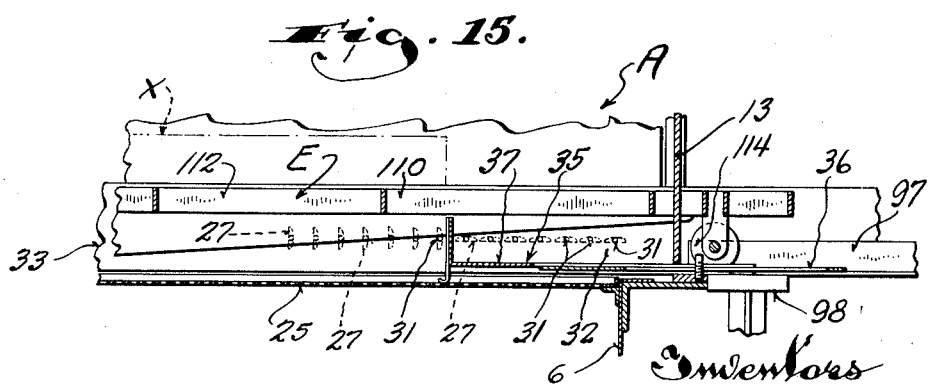

Figures 13 and 13a together comprise a diagrammatic illustration of the hydraulic and electrical system of control;

Figure 14 is a horizontal section view through the oven illustrating a slight modification therein;

Figure 15 is a cross section view through Figure 14 on the plane of the line 15—15;

Figure 16 is a detail section view taken through Figure 5 on the plane of the line 16—16;

Figure 17 is a cross section view through the conveyer mechanism for carrying the cores into and out of the oven, illustrating a slight modification thereof; and Figure 18 is a view similar to Figure 17, but showing the parts in another position.

Referring now particularly to the accompanying drawings, it will be seen that the complete apparatus forms one unitary structure with all portions thereof associated and coacting to a common end, but for the purpose of description and for the sake of clarity, the apparatus may be divided into a plurality of units or component parts.

So treated, the apparatus consists of an oven unit, designated by the letter A, a heat source and heat recirculating system B, a squaring unit C, and a loading station D. The loading station D and the squaring unit C, are arranged, respectively, in front of and to the rear of the oven unit A, while the heat source is located to one side of the oven unit and the squaring unit.

Besides these units, the apparatus further comprises a conveyer mechanism, indicated generally by the letter E, and an acid bath F. The acid bath F is conveniently located alongside the loading station D so that cores after they have been dipped may be slid directly onto the loading station in position to be picked up by the conveyer mechanism. The conveyer mechanism carries the cores from the loading station into the oven unit and carries the baked cores from the oven unit to the squaring unit.

The functioning of all of these several component parts of the apparatus is controlled and governed substantially entirely automatically by a system of hydraulic and electrical control, as will be hereinafter more fully described. The only manual attention required is for the operator to place a fresh core in position to be dipped, to actuate a lever which starts the dipping mechanism, and then slide the dipped core onto the loading station from which it is automatically conveyed into the oven and from the oven to the squaring unit. After the core has been squared, it is either manually removed from the squaring unit, or it may be mechanically conveyed away from the apparatus.

*Oven unit*

The oven unit, designated generally by the letter A, consists of an upright enclosed chamber 5. This chamber 5 has a lower substantially rectangular section 6 consisting of front, rear and side walls suitably constructed of sheet metal and supported by framework preferably just off the floor. One side wall of this lower section 6 has an inlet opening 7 through which heated gases enter the lower portion of the oven to rise upwardly therethrough. At a convenient height and above the inlet 7 through which the heated air enters the oven interior, is the baking zone of the oven.

This baking zone is defined jointly by the lower section 6 and an upper section or hood 8 mounted on top of the section 6, as shown. The hood 8 tapers upwardly to a restricted outlet which connects with a recirculating duct 9 of the circulating system, to be hereinafter described.

The front and rear walls of the oven in horizontal alignment with the central portion thereof which has been designated the baking zone, respectively have inlet and outlet openings 10 and 11 through which the radiator cores, diagrammatically illustrated and designated X, enter and leave the oven. The walls of the oven, and particularly the walls of its hood 8 and the recirculating duct 9, are preferably insulated, but for the sake of clarity, the insulation has been omitted from the drawings.

The inlet and outlet openings 10 and 11 through which the cores enter and leave the oven are adapted to be closed by doors 12 and 13, respectively. The doors 12 and 13 are slidably mounted in guideways 14 resting on elongated channel iron rails 15 extending longitudinally along the sides of the oven. The doors consequently move vertically to and from their closed positions and are interconnected so as to operate in unison.

For this purpose, a pair of meshing segments 16 with extended arms 17 are pivotally mounted from the supporting structure of the oven at each side thereof. The outer extremities of the arms 17 have a sliding pivotal connection with trunnions 18 fixed to the doors so that as the segments are rocked from one position to the other, the doors are simultaneously raised and lowered.

To actuate the segments so as to open and close the doors, one of the segments has a lever arm 19 fixed thereto, to the extremity of which the ram or piston 20 of a hydraulic cylinder 21 is attached. The opposite end of the cylinder is suitably mounted from the supporting structure of the oven so that as its ram is reciprocated back and forth, the segments are rocked to open and close the doors.

As already pointed out, baking ovens heretofore used in the manufacture of radiator cores have been of the radiant type and as a consequence, it was impossible to obtain uniform and satisfactory results. The oven here employed is of the convector type. In themselves and in general, such ovens and baking units are not new. It is also acknowledged that baking and drying apparatuses incorporating a recirculation of heated gases have been employed in the past. However, all past drying and baking systems, even those of the convector recirculating type, were unsuited and unsatisfactory for the specific purpose of baking radiator cores.

One of the principal difficulties encountered in all past attempts to provide for proper radiator core baking was uniform distribution of the heat to all portions of the radiator core. In the present invention, a simple but exceedingly efficient and practical construction is employed to insure complete uniformity in the distribution of heat to the core.

To this end, the oven has a distribution plate 25 extending horizontally across its entire area directly beneath its baking zone. This distribution plate is supported at its marginal edges from the walls of the oven and consists of a screen plate having a multiplicity of uniform sized openings or apertures. By virtue of this distribution plate, the heated gases entering the lower portion of the oven are uniformly distributed over the entire cross sectional area of the oven so that they rise uniformly through the baking zone to act with equal effect upon all portions of the core which rests flatwise above the plate.

The oven is large enough to accommodate the largest core to be handled. When a core of maximum dimensions is being baked, it is of course desirable and necessary that the heating gases be permitted to rise through the oven throughout its entire cross sectional area, but when the cores are smaller, it is desirable to close off all of the cross sectional area of the oven in excess of that of the radiator core being handled.

In other words, the rising heated gases should be concentrated so that the entire volume thereof flows through the core and is not wasted by flowing around the sides thereof. Adjustment of the open area to accommodate cores of different sizes is effected by a plurality of louvers mounted directly above the distribution plate 25. There are longitudinal louvers 26 extending from the front to the rear walls of the oven at opposite sides of a central space along which the conveyer mechanism E extends, and transverse louvers 27 arranged at right angles to the longitudinal louvers and beneath the same.

These transverse louvers 27 extend from the opposite side walls of the oven to the central space allotted to the conveyer mechanism and are arranged only at the rear half of the cross sectional area of the oven.

The louvers 26 and 27 are alike in construction and are substantially in the form of elongated slats of a width slightly less than the spacing between their centers so that when closed, that is when horizontal, they form substantially a solid barrier.

The louvers 26 have trunnions 28 fixed to both their ends which trunnions pass through holes in the front and rear walls of the oven to rotatably mount the louvers. Cross pins 29 on the trunnions projecting from the front wall of the oven provide handles by which the louvers may be turned from closed to open position and also serve to indicate the positions of the louvers. If desired, some suitable detent means may be employed to yieldingly hold the louvers in either open or closed position.

Like the louvers 26, the transverse louvers 27 have trunnions 30, but in this instance the trunnions are mounted only on the outer ends of the louvers to project from the opposite side walls of the oven. These trunnions also have cross pins 29 to enable adjustment of the louvers and to indicate their positions. The inner ends of the transverse louvers 27 have pivot pins 31 journalled in vertical flanges 32 extending longitudinally across the oven at the sides of the central space which is allotted to the conveyer mechanism to support the inner ends of the louvers 27.

The upper edges of the flanges 32 provide supports upon which the core rests while in the oven. These longitudinally extending flanges 32 are the vertical flanges of angle irons 33 which extend forwardly and rearwardly of the oven to provide core supports for the loading station D and the squaring unit C, respectively. These angle irons are supported in proper elevated positions above the floor by legs 34.

When a core is carried into the oven through its inlet opening 10, the conveyer, as will be hereinafter described, having a predetermined travel, always deposits the core with its trailing edge just inside the front wall of the oven. The location of its side and front or leading edge at this position of rest is dependent upon the size of the core.

Through the medium of the longitudinal louvers 26 and the transverse louvers 27, the cross sectional area of the oven in excess of the area of the core may be completely closed off at its sides by the longitudinal louvers 27. The rear portion of the oven, however, can be closed off against the passage of heated gases around the innermost edge of the core but partially, inasmuch as these transverse louvers do not extend across the central open space in which the conveyer mechanism moves.

While under ordinary circumstances the amount of heated gases which passes through this open space is not excessive and does not seriously detract from the efficiency of the apparatus, more complete closure can be had through the use of a sliding plate structure, such as illustrated in Figures 14 and 15. This plate structure, indicated generally by the numeral 35, consists of two slidingly joined outer and inner plates 36 and 37 of a width to substantially span the open central space and adjustable longitudinally in accordance with different core sizes. The specific construction of the closure plate and its manner of mounting is believed to be clear from Figures 14 and 15.

Circulatory heating system

The hot gases which provide the heating medium eminate from a heating unit, indicated generally by the numeral 40. This unit may be of any suitable construction and comprises an elongated combustion chamber 41 mounted alongside the oven and squaring unit, provided with a burner 42 from which a flame projects into the combustion chamber.

At its end opposite the burner, the combustion chamber opens to a blower 43, the fan of which is driven by a motor 44. The blower 43 discharges directly into the lower portion of the oven through a discharge duct 45 leading to the opening 7 in the adjacent side wall of the oven. A direct path is thus provided for the heated gases from the heat source to the oven.

After rising upwardly through the baking zone of the oven, the gases are drawn off through the duct 9 and conducted back to the combustion chamber for recirculation. At the top of the circulatory system formed by the duct 9, there is an outlet or exhaust port 46 leading to a stack or other suitable outlet through which some of the burnt and spent gases are vented.

The heating and circulatory system is probably best illustrated by the graphical showing in Figure 12.

Squaring unit

The squaring unit, as indicated hereinbefore, is located directly to the rear of the oven so as to receive the cores directly upon their removal from the oven. In this manner, any relative motion between the tubes and fins which may be necessary during straightening and squaring takes place before the solder has permanently set.

The upper edges of the vertical legs of the angle irons 33 projecting rearwardly from the oven provide supports upon which the core is deposited in position for the mechanism of the squaring unit to act thereon. Outwardly of these angle irons 33 are the longitudinal channel rails 15 joined at their rear extremities by a cross bar 50.

Rising up from the channel rails 15 near their rearmost ends and also near the rear wall of the oven are upright pedestals 51 joined at their upper ends by transverse channel cross beams 52. Depending from the forward cross beam 52 is a bracket 53, the lower end of which mounts a fixed transverse pressure plate 54 against which one edge of the core is pressed during the squaring and straightening operation.

The bracket 53 also supports the adjacent ends of two spaced longitudinal rods or shafts 55, the opposite rear ends of which are fixed in brackets 56 carried by the rear cross beam 52. Slidably mounted on the rods or shafts 55 is a cross head 57, which carries a movable transverse pressure plate 58 in parallelism with the fixed plate 54.

Also slidably mounted on the rods or shafts 55 forwardly of the cross head 57 is a carrier member 59 upon which a hydraulic cylinder 60 is mounted. The ram or piston of the cylinder is connected through its rod 61 with the cross head 57 so that as the piston is reciprocated, the cross head, and consequently the pressure plate 58 carried thereby, is moved toward and from the opposite plate 54.

To accommodate radiator cores of different sizes, the cross head 57 and its actuating cylinder 60 may be slid on their supporting shafts 55 as required and to facilitate adjustment thereof, a lead screw 62 is provided. The screw 62 is journalled at its opposite ends in bearings 63 mounted on the central portions of the cross beams 52 and has its rearmost end squared for the reception of a crank. Threaded on the screw 62 is a nut 64 which is fixed to the carrier member 59 upon which the hydraulic cylinder 60 is mounted. Consequently, by turning the screw 62, the entire pressure applying assembly is adjustable longitudinally toward and from the fixed pressure plate 54.

The pressure plates 54 and 58 are in exact parallelism and engage the front and rear edges of the radiator core. The side edges of the core are similarly engaged by a fixed pressure plate 65 and a movable pressure plate 66. The fixed pressure plate 65 is mounted on two parallel connected rods 67 slidable in bearings 68 which form part of a bracket 69. The bracket 69 is secured to a supporting table 70 rigidly carried by the adjacent channel rail 15. The bracket 69 may be secured to the supporting table 70 in a number of different positions to accommodate different core sizes.

The pressure plate 65 is adjustable transversely by sliding its supporting rods 67 through their bearings 68. This adjustment is facilitated by a lead screw 73 threaded in a fixed nut carried by the supporting table and bearing against a cross head 74 which joins the outer ends of the rods 67.

The opposite pressure plate 66 is movable by a hydraulic cylinder 75 to effect a clamping action. This plate 66 is carried by two spaced rods 76 slidable in tubes 77 which in turn are slidable in bearings 78 forming part of a bracket 79 similar to the bracket 69 and similarly adjustably mounted on a supporting table 80.

Fixed to the inner ends of the tubes 77 is a transverse member 81 upon which the hydraulic cylinder 75 is mounted. The piston or ram of the cylinder is connected through a rod 82 with the casting by which the pressure plate 66 is mounted on the rods 76 so that as the piston or ram is reciprocated, the pressure plate 66 is moved toward and from the pressure plate 65. Through the adjustment of the tubes 77 in the bearings 78, the location of the pressure plate 66 is adjustable to coact with the adjustment of the plate 65 and enable both plates to be centered with respect to the conveyer mechanism. The pressure plates themselves are removable from the castings upon which they are fastened to permit replacement thereof with either larger or smaller plates to conform to the size of the radiator cores being handled.

After the adjustments in the location of the pressure plates have been effected in the manner described, accidental displacement is prevented by the provision of suitable set screws by which the various adjustable members are locked in place, as will be clear from the drawings.

Figure 1:
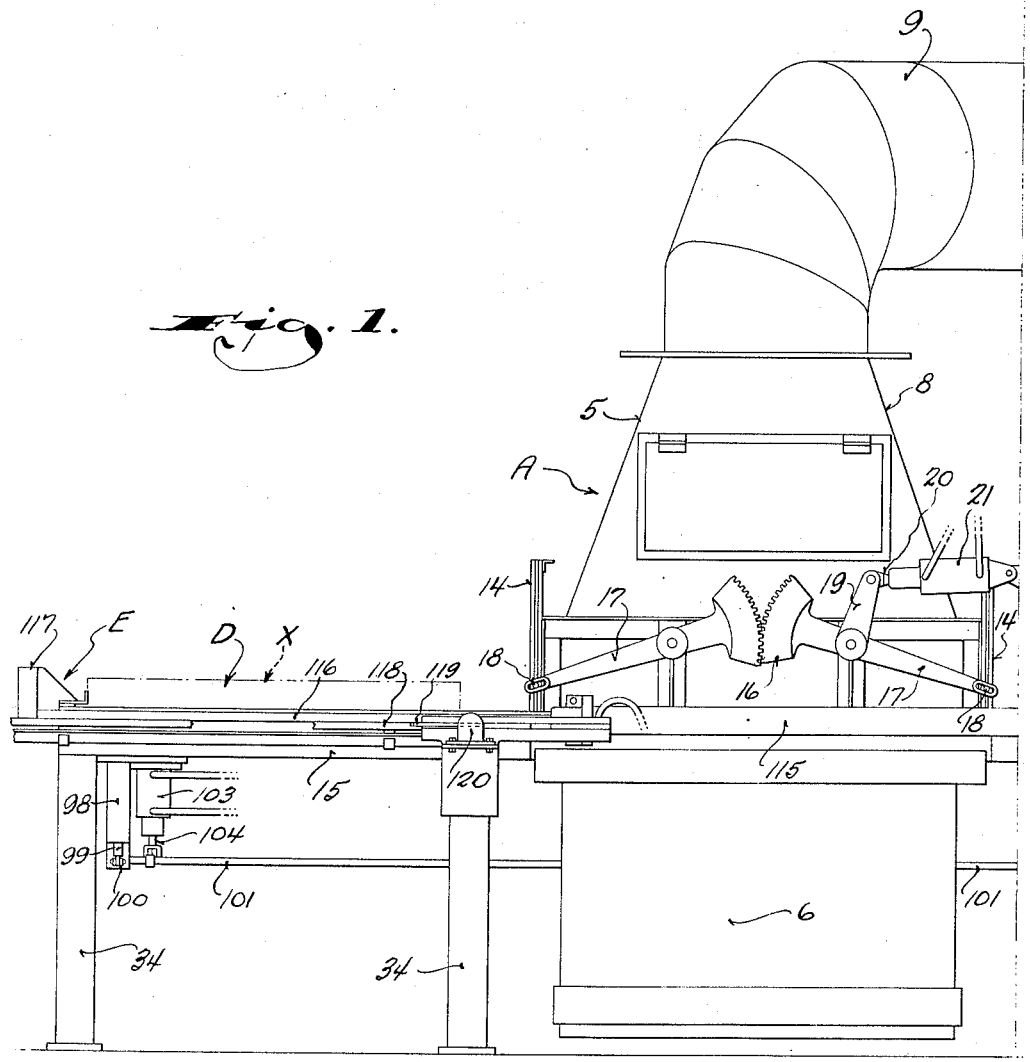

From Figures 1a and 4a, it is particularly apparent that the pressure plates or clamping members are disposed at an elevation above the core supports 33 so that when the cores are deposited at the squaring device, they must be lifted into alignment with the pressure plates.

For this purpose, a lifting table or elevator 85 is located between the supports 33. The elevator is normally below the level of the supporting edges a distance sufficient to permit the passage of the conveyer carriage to be hereinafter described.

This table or elevator 85 is in the form of a rectangular casting and is guided for vertical motion by a plurality of vertical rods 86 slidable in bearings 87 forming part of a casting 88 secured to the undersides of the rails 33. The casting 88 also has a hydraulic cylinder 89 depending centrally therefrom, the ram or piston of which is connected through its rod 90 with the table or elevator 85 so that upon response of the piston, the table is elevated, as shown in dotted lines in Figure 4a, to lift a radiator core deposited thereabove into position to be clamped between the pressure plates.

The functioning of the hydraulic cylinders which actuate the table or elevator, and the movable pressure members are so coordinated that proper sequence of operations is maintained.

Loading station

The loading station D, as noted hereinbefore, is located directly in front of the oven and in proximity to the acid dip tank to receive cores directly therefrom. It comprises the spaced core supports 33, which as noted hereinbefore, are angle irons with the upper edges of their vertical flanges providing the actual supports. A suitable fabricated structure including the legs 34 mounts the supporting angle irons 33. Between that side of the loading station at which the acid bath is located and the supports 33, a structural platform 95 consisting of a plurality of transverse strips extends from the side of the loading station to the adjacent support 33 to facilitate sliding the radiator cores after they have been dipped onto the supports 33.

Conveyer mechanism

The conveyer mechanism E which carries the cores from the loading station into the oven and from the oven to the squaring device, comprises two spaced parallel tracks 96 located at the loading station D, and two similar spaced parallel tracks 97 located at the squaring device. Both sets of tracks lie inside the core supports 33. The tracks comprise angle irons either mounted as shown in Figures 6 and 6a, or as shown in Figures 17 and 18. In each instance, the tracks are located only outside the oven, as shown, so as not to interfere with the upward flow of heated gases.

Both sets of tracks are movable vertically in unison for a purpose to be described. The manner in which this motion of the tracks is effected is best illustrated in Figures 6 and 6a. As here shown, the core supporting angle irons 33 have transverse castings 98 fixed to their undersides, one located at each end of each track section. These castings 98 have vertical bores in line with the tracks to slidably receive rods 99 which extend entirely through the castings to project above the top thereof and be connected to the adjacent portions of the tracks. Hence, by pushing the rods 99 up it is possible to lift the tracks from their normal lowermost position, shown in Figure 6, to an elevated position, shown in Figure 6a.

There are four such rods 99 for each track section, making a total of eight and the lower end of each rod has the free end of a lever 100 pivoted thereto. The levers 100 are secured to longitudinal shafts 101 journalled in bearings 102 carried by the castings 98 and extend longitudinally along the entire length of the machine. Through these shafts 101 and the levers 100, which are secured thereto, all in the same positions, it is possible by merely rocking the shafts to simultaneously lift the tracks.

The shafts 101 are rocked to effect lifting and lowering of the tracks by a hydraulic cylinder 103 suspended from the core supports under the loading station. The ram or shaft of the hydraulic cylinder 103 has its rod 104 pivoted to the free ends of two levers 105 secured to the shafts 101. As the ram or piston in the cylinder 103 is forced downwardly, the shafts are rocked in directions to cause the track sections to be raised from their normal lowered positions to their elevated positions.

Riding on the tracks 96 and 97 is a carriage 110. The carriage 110 is an elongated rectangular fabricated unit having longitudinal side rails 111 and a central longitudinal rail 112 joined by cross members 113. The length of the carriage is such that when it is in its fully retracted position ready to receive and carry a core into the oven and remove a core already in the oven therefrom, one end of the carriage is just outside the rear wall of the oven and its other end is at the extreme front of the loading station.

At its ends, the carriage has wheels 114 which ride on the tracks. In the modified embodiment of the conveyer mechanism, shown in Figures 17 and 18, these wheels 114' have a peripheral central groove to ride on the edge of the tracks, as shown.

The carriage is reciprocated by an elongated hydraulic cylinder 115. The piston or ram of the cylinder 115 has its piston rod 116 attached at its outer free end to the carriage through a sidewise extension 117 fixed to the carriage.

Movable with the carriage alongside the piston rod 116 is a bar 118 upon which two cams 119 are mounted. The distance between the cams corresponds to the total travel of the carriage, and as best shown in Figure 3, these cams are adapted at the limits of the carriage travel to actuate the plunger of a valve unit 120, to be hereinafter more fully described. The function of the valve unit 120 is to slow down the speed of the carriage as it approaches its limits of travel.

As already pointed out, the tracks upon which the carriage rides are movable in unison from a normal lowered position to an elevated position. In the normal lowered position of the tracks, the top of the carriage is beneath the plane of the upper edges of the supports 33 so that when the tracks are lowered, the carriage can move without contacting a core resting upon the supports. However, when the tracks are elevated, the top of the carriage rises above the plane of the supports and picks up a core resting thereon.

To insure that a core picked up by the carriage from the loading station will be carried the proper distance into the oven, a pusher member 121 is mounted on the carriage to provide a guide against which the adjacent edge of the core is brought. Inasmuch as the distance of travel of the carriage is always the same and as the pusher member moves just into the oven, it follows that a core conveyed into the oven is always located at a definite position with respect to the front wall of the oven.

As will be readily apparent, if a core has already been conveyed into the oven, the rising of the carriage to enable the feeding of a core into the oven also lifts the baked core and conveys it out through the outlet opening of the oven to deposit it at the squaring device. When the carriage has moved rearwardly to its limit of travel, the tracks descend and the carriage is returned to its initial position without touching the cores it has just conveyed.

It is to be observed that the central longitudinal rail 112 of the carriage is interrupted at points in line with the doors of the oven when the carriage is in its normal position so as to permit central depending aprons 125 on the doors to extend down between the tracks and more effectively close the inlet and outlet openings of the oven.

In connection with the modification of the conveyer mechanism illustrated in Figures 17 and 18, it is to be observed that with the tracks mounted in this manner, any acid which may drip from the cores is drained off of the tracks and away from the vertical rods 99 which mount them so as to preclude corrosion and insure a free easy action at all times. The acid drained from the cores may be caught in pans 126 supported from the channel rails 15 and extending beneath the conveyer mechanism.

Acid bath

The acid bath which is located directly to the left of the loading station comprises a tank 130 large enough to take the largest size radiator core for which the apparatus is designed. The tank 130 is supported above the floor by a suitable fabricated frame structure 131 including legs at the four corners of the tank.

The cores are dipped into the bath by a dipping frame 132. This frame is mounted to descend from a normal position substantially in horizontal alignment with the top of the tank, as shown in Figure 9, to the bottom of the tank, as shown in Figure 10, at the dictation of a hydraulic cylinder 133. The dipping frame 132 is pivotally mounted, as at 134, from the side arms 135 of a U-shaped carrier 136. The side arms 135 lie just inside the side walls of the tank.

Attached to the U-shaped frame at the rear corners thereof are two yokes 137, the rear legs of which are slidable in slideways 138 mounted at the rear of the tank. The height of these yokes is sufficient to straddle the full height of the rear wall of the tank when the U-shaped carrier 136, and consequently the dipping frame 132 pivoted thereto, is in its lowermost position, shown in Figure 10.

The lower ends of the rear legs of the yokes 137 are connected by a cross member 139 which has the piston rod 140 of the cylinder 133 connected thereto. Hence, as the piston or ram of the cylinder 133 is reciprocated, the dipping frame is raised and lowered.

During the descent of the frame to dip the core, the frame remains in its normal horizontal position, but when the frame is lifted to carry the core out of the acid bath, it is automatically tilted to facilitate draining the excess acid therefrom.

For this purpose, the forward end of the dipping frame has two sidewise extending lugs 141 at its front corners which at all times engage stepped stop members 142. The upper ends of these stop members are fixed to a cross shaft 143 which is journalled in suitable bearings carried by the tank. Also fixed to the shaft 143 is a weighted lever 144 which constantly tends to turn the shaft 143 counter-clockwise and yieldingly urges the stop members 142 against the lugs 141.

At a point substantially in line with the normal acid level, the stop members have abrupt steps or shoulders 145 so that as the dipping frame rises and its lugs 141 engage these steps, continued rising of the carrier 136 causes the dipping frame 132 to tilt to its position illustrated in Figure 11. The frame remains in this tilted position until the lever 144 is lifted to disengage the steps 145 from the lugs 141 whereupon the dipping frame drops back to its normal horizontal position. Inasmuch as the frame is substantially over-balanced to the rear, its return to normal position upon release of the connection holding it tilted is accompanied with a considerable jar which further shakes off excess acid.

Conveniently located alongside the lever 144 is a hydraulic valve unit 146 having a manual control lever 147. Through the valve 146 operable manually by its lever 147, the functioning of the hydraulic cylinder 133 which operates the dipping frame is controlled.

System of control

The control system is divisible into two sections, one the control for the dipping of the cores and the other the automatic control for the operation of the conveyer mechanism, the opening and closing of the oven doors, and the operation of the squaring device.

The control system for the dipping of the cores includes the valve 146, already mentioned, an oil pump 150 driven by a motor 151, the hydraulic cylinder 133, a speed control valve 152, a valve 153, a check valve 154, and suitable piping connecting these different units in a manner to be fully described under the sub-heading "Operation".

The automatic control for the conveyer mechanism, the doors and the squaring device is electrical and hydraulic. Its electrical branch consists of a main switch 155, a timer 156 by which the length of the cycle and the period of baking is determined, a signal 157, two solenoids 158 and 159, a timer control switch 160 operable by the closing of the oven doors, and a control switch 161 to control the energization of the solenoid 159 from the motion of the carriage. These electrical units are of course connected by proper wiring and while in actual practice, the electrical control equipment embodies many refinements and additions to that illustrated, for the sake of clarity, the simplified disclosure shown has been used.

The hydraulic branch of the automatic control for the conveyer mechanism, the doors and the squaring device, includes the pump 150, already mentioned, all of the hydraulic cylinders, already described, and by which the clamping function of the squaring device, the opening and closing of the oven doors, the raising and lowering of the conveyer track, the operation of the core elevator at the squaring device, and the reciprocation of the carriage is effected. All of these cylinders have already been designated.

Besides the pump and the hydraulic cylinders, the hydraulic automatic control system includes a plurality of control valves, namely, an automatic valve 165 operable by the solenoids 158 and 159, a pressure actuated control valve 166, a combined pressure and mechanically actuated valve 167, another combined pressure and mechanically actuated valve 168, and another combined pressure and mechanically actuated valve 169. The hydraulic system further includes delayed action valves 170, 171, 172 and 173, two speed control valves, one an adjustable needle valve 174, and the other the carriage motion actuated valve 120, and finally a check valve 176. All of these hydraulic units are connected by suitable piping to be later described.

Operation

Assume that the main switch 155 is closed so that the electrical portion of the automatic system is operable and that the switches (not shown) controlling the blower motor and the pump motor, are closed and that the heating unit is functioning. A core to be baked is first deposited on the dipping frame of the acid bath. The lever 147 of the valve 146 is moved to its full line position shown in Figure 13. This motion of the lever 147 so disposes the plunger of the valve 146 that oil under pressure may flow from the feed line 200 coming from the pump, through the valve 146 into line 201 which leads to the top of the hydraulic cylinder 133 thereby causing the descent of its piston to lower the dipping frame into the acid bath.

In Figure 13, the piston of cylinder 133 is shown near the bottom of its descent. While the pressure is being applied above the piston, the oil beneath the piston is being forced from the cylinder through line 202 in which the speed control valve 152 is interposed, and which leads to the valve 146 and through it to the return or exhaust line 203. The speed control valve 152 retards the descent of the core to insure proper fluxing.

As the piston of the cylinder 133 reaches the bottom of its stroke, a cam 204 movable therewith presses in the spring urged plunger of the valve 153 to reverse the application of oil pressure from above to beneath the piston of the cylinder 133. This is done in the following manner.

As the plunger of the valve 153 is pressed in, pressure from the feed line 200 is applied through the valve 153 onto line 199 which leads to the valve 146 in such a manner that the plunger thereof will be caused to move to its position designated in Figure 13 by the dotted line position of its handle 147. The readjustment of the plunger of valve 146 connects the pressure line 200 through the valve 146 to the line 202 and connects the line 201 with the exhaust or return line 203. The piston of the cylinder 133 is thus caused to return to its normal elevated position bringing the core up out of the acid bath.

It will be recalled that as the core is lifted out of the acid bath, it is held in an inclined position until the lever 144 is manually actuated dropping the dipping frame back to its horizontal position to allow the core to be slid across to the loading station. The disposition of the core on the loading station is so timed with respect to the automatic operation of the conveyer as to be in position in time to be picked up by the conveyer and carried into the oven.

For the sake of clarity and convenience in describing the automatic operations, the several component parts are shown in the positions they occupy at that point in the cycle at which a fresh core has just been placed in the oven and a baked core removed from the oven and positioned at the squaring device. The conveyer tracks are lowered and the carriage has just been retracted to its loading position which closed the switch 161 and momentarily energized the solenoid 159 to pull the plunger of the automatic valve 165 to the right. As a consequence of this adjustment of the valve 165, the hydraulic cylinder 21 is functioning to close the oven doors and the hydraulic cylinder 89 is functioning to lift the core at the squaring device into clamping position.

The fluid pressure operating in the cylinders 21 and 89 is derived from the feed line 200, one branch of which enters the valve 165 after passing through the check valve 176. By virtue of the then adjustment of the valve 165, the fluid pressure from the feed line continues through the valve 165 onto line 205, one branch of which leads to one end of the door controlling cylinder 21, another branch of which has the manually adjustable valve 174 interposed therein and leads to the lower end of the cylinder 89, and a third branch of which has the delayed action valve 173 interposed therein and leads to the cylinders 60 and 75 of the straightening or squaring device.

Inasmuch as the passage to the cylinder 21 is unrestricted, the descent of the doors is rapid and takes place prior to the completion of the retarded elevation of the core lifting elevator at the squaring device. During the in-stroke of the piston in the cylinder 21 and the ascent of the piston in the cylinder 89, the fluid respectively ahead of and above these pistons is exhausted through a line 206, passing the delayed action valve 170 unrestrictedly and reaches the valve 165 where it connects with the return line 203.

When the door closing cylinder 21 has functioned to completely retract its piston and close the doors, it closes the electric switch 160 which initiates the functioning of the timer 156. The setting of the timer 156 determines the length of the baking period.

After the door closing cylinder 21 has functioned and the slower moving piston in the cylinder 89 has reached its upper limit of motion and has carried the core into clamping position, the pressure builds up in the line 205 to overcome the spring in the delayed action valve 173 and impresses the fluid pressure on the pistons of the cylinders 60 and 75. As a consequence, the pistons of these cylinders are moved in the direction to effect the clamping and straightening of the core in clamping position.

By virtue of the provision of the check valve 176, there is no diminution in the fluid pressure effecting the clamping action which thus obtains as long as the core in the oven is baking. At the end of the baking period as determined by the setting of the timer, the circuit for the solenoid 158 is established and also the signal 157 is energized to denote the completion of the baking period.

The energization of the solenoid 158 which is but momentary snaps the plunger of the valve 165 to the left. As a result of this readjustment in the valve 165, fluid pressure is impressed on line 206, one branch of which leads directly to the cylinders 60 and 75 of the straightening device, and as the opposite ends of these cylinders are connected to the exhaust or return line through the line 205, the application of pressure on the line 206 immediately releases the core for descent back onto its supports from which it may be automatically conveyed.

After the pistons in the cylinders 88 and 75 have been actuated to release the core from the clamping action, the pressure on line 206 overcomes the spring of the delayed action valve 170 to apply pressure on its other branches which lead to the inner end of the door opening cylinder 21 and to the top of the core elevating cylinder 89. As a result, the oven doors are immediately opened and the core elevator at the squaring device is slowly lowered to lower the core just straightened and squared down onto the supports.

As the piston of the door controlling cylinder 21 approaches the limit of its out-stroke to open the doors, it pushes the plunger of the valve 168 to the left, and when the piston in the cylinder 89 has descended to its limit, it pushes the plunger of the valve 167 to the left. As a consequence of the readjustment of the plungers in the valves 167 and 168, the plunger in the valve 166 is shifted from its then position to the opposite or right hand position as follows.

The inlet port of the valve 167 is connected with the feed line 200 so that when its plunger is moved to the left, the pressure is continued through the valve 167 onto line 208 which leads to one port of the valve 168. The plunger of this valve being also moved to the left, the pressure is continued onto line 209 which leads to the left hand end of the valve housing 166 applying fluid pressure thereon to move the plunger therein to the right.

With this readjustment of the plunger in the valve 166, the pressure from the feed line 200 which connects with the valve 166 passes through the valve and onto line 210 leading from the valve 166 to one end of the track lift cylinder 103 and through the delayed action valve 172 to the front end of the carriage actuating cylinder 115. The piston in the track lift cylinder is thus immediately pushed out to lift the tracks of the conveyer, and when this is accomplished, the pressure on line 210 overcomes the spring of the delayed action valve 172 and enters the cylinder 115 to push its piston into the cylinder and move the carriage in its feeding stroke.

The fluid ahead of the piston in the track lift cylinder and ahead of the piston in the carriage cylinder is exhausted through line 211 which has the retarding valve 175 interposed therein and also the delayed action valve 171, which, however, does not function in this direction of flow. The retarding valve 175, it will be recalled, functions at the termini of the carriage stroke to retard the speed thereof.

When the piston of the cylinder 115, and consequently the carriage, reach the limit of their feeding stroke at which time the core is properly positioned within the oven and the baked core deposited at the squaring device, the plunger of the valve 169 is depressed and as a result the plungers of the valves 167 and 168 are moved to the right. This motion of the plungers of the valves 167, 168 is effected by the fluid pressure from the feed line 200 passing through valve 169 onto line 212 which leads to the casings of the valves 167, 168. Any pressure in excess of that required to shift the plungers of the valves 167, 168 to the right is vented through the branches of exhaust or return line 203 connecting with the casings of the valves.

Upon the readjustment of the positions of the plungers in valves 167 and 168, the plunger of valve 166 is moved to the left causing the conveyer track to be lowered and the carriage to be retracted. The manner in which this is accomplished is as follows.

The fluid pressure from the feed line 200 now passes through valve 167 onto line 215 which leads to valve 168. The then position of the plunger in the valve 168 continues the fluid pressure through to line 216 which leads to the right hand end of the valve 166 forcing its plunger to the left. The fluid ahead of the plunger in the valve 166 is exhausted through the branch of the return line 203 connected with the valve 166.

With the plunger in the valve 166 moved to the left, the pressure from the feed line 200 passes through valve 166 onto line 211 which leads directly to the track lift cylinder 103 causing its plunger to move inwardly and lower the conveyer track. Subsequently to the lowering of the track, the spring in the delayed action valve 171 is overcome so that the pressure continues through the retarding valve 175 to the rear end of the cylinder 115. The pressure applied at this point in the cylinder 115 causes the carriage to be retracted out of the oven to its loading position. As the carriage reaches the limit of its retractive stroke, it closes the switch 161 to momentarily energize the solenoid 159 and thereby pull the plunger of the valve 165 to the right which effects closure of the oven doors and a lifting of the core elevator, as described.

From the foregoing description taken in connection with the accompanying drawings, it will be readily apparent to those skilled in the art to which this invention appertains, that this invention provides greatly improved means for baking radiator cores to solder the tubes and fins together and that uniformly good results are obtained thereby and the time required for the operation is reduced to a minimum.

What we claim as our invention is:

1. In an apparatus for baking radiator cores of a wide variety of sizes, a baking oven having a cross sectional area sufficiently large to accommodate the largest size of the core for which the oven is designed, means for inducing a flow of heated gases through the oven, means for supporting a core to be baked within the oven crosswise of said current of heated gases, a plurality of adjacent baffles extending across the oven between the core supporting means and the inlet for heated gases, means mounting said baffles for adjustment to and from positions blocking the flow of gases so that a plurality of baffles may be adjusted to substantially close the cross sectional area of the oven in excess of that of the core to thereby concentrate the flow of heated gases onto the core, and means operable exteriorly of the oven for adjusting the baffles.

2. In an apparatus for baking radiator cores and the like, an upright oven chamber having a horizontal cross sectional area large enough to accommodate the largest size of radiator core for which the apparatus is designed, means for inducing a flow of heated gases upwardly through the oven, means for supporting a radiator core horizontally within the oven so that the heated gases flow crosswise therethrough, and adjustable baffles arranged at right angles to each other for closing off the cross sectional area of the oven in excess of that of the core so as to prevent the flow of heated gases through the oven except as they pass through the core.

3. In a baking oven of the character described, an oven chamber having inlet and outlet openings in opposite walls thereof, horizontally aligned supports within the oven chamber and in front of and in back of the oven chamber adjacent the inlet and outlet openings upon which articles to be heat treated are adapted to rest, track means in front of and in back of the oven chamber, a conveying carriage movable on said track means to carry articles from one of said supports to the other, and means for raising and lowering said track means in unison to cause the conveying carriage to rise above and descend beneath the plane of said supports so as to lift articles off of the supports and deposit them thereon.

4. In a baking oven of the character described, an oven chamber having inlet and outlet openings in opposite walls thereof, horizontally aligned supports within the oven chamber and exteriorly thereof adjacent the inlet and outlet openings upon which articles to be heat treated are adapted to rest, a conveying carriage movable along said supports for carrying articles from one to the other, track means in front of and in back of the oven chamber and upon which said carriage runs, and means to raise and lower said track means to lift the top of the carriage above and sink the same beneath the plane of said supports so that the carriage is capable of picking up an article from any one support, carrying it to another, and depositing it thereon.

5. In a baking oven of the character described, an oven chamber having inlet and outlet openings in opposite walls thereof, aligned supports lying in the same horizontal plane and disposed exteriorly of the oven and interiorly thereof and adapted to support articles exteriorly and interiorly of the oven, a carriage movable along said supports for carrying articles from one to the other, means for reciprocating the carriage for a predetermined distance sufficient to carry an article from one exterior support onto the interior support and from the interior support out to the other exterior support, track means in front of and in back of the oven chamber and on which said carriage runs, and means for raising and lowering the track means to project the carriage above the level of the supports at one terminus of its travel and sink it beneath the level of the supports at its other terminus of travel.

6. In a baking oven of the character described, an oven chamber having inlet and outlet openings in opposite walls thereof, aligned supports lying in the same horizontal plane and disposed exteriorly of the oven and interiorly thereof and adapted to support articles exteriorly and interiorly of the oven, a carriage movable along said supports for carrying articles from one to the other, means for reciprocating the carriage for a predetermined distance sufficient to carry an article from one exterior support onto the interior support and from the interior support out to the other exterior support, track means in front of and in back of the oven chamber and on which said carriage runs, means for raising and lowering the track means to project the carriage above the level of the supports at one terminus of its travel and sink it beneath the level of the supports at its other terminus of travel, and means for automatically coordinating the raising and lowering of the track means with the reciprocation of the carriage.

7. In a baking oven of the character described, an oven chamber, means for inducing a flow of heated gases through the oven chamber, a conveyer movable to carry articles to be baked into the oven chamber, adjustable means for closing off the cross sectional area of the oven chamber in excess of that occupied by the article to be baked and to the sides of the conveyer, and adjustable means for closing off the remaining space in line with the conveyer and not occupied by the article to be baked.

8. In a baking oven of the character described, an oven chamber, means for inducing an upward flow of heated gases through the oven chamber, a conveyer movable in a horizontal central path through the oven for carrying articles to be baked into the oven and removing them from the oven, adjustable means at the opposite sides of said space for closing off the cross sectional area of the chamber in excess of that occupied by the article, and other adjustable means in line with the conveyer cooperating with said first named means to complete the closure and prevent the by-passing of heated gases around the article.

9. In a baking apparatus of the character described, an oven chamber, a conveyer for carrying articles to be baked into and out of the oven chamber, including a carriage movable along a defined path and having a predetermined distance of travel, hydraulic means for moving the carriage, including a cylinder, a piston in the cylinder connected with the carriage, and feed lines leading to the opposite ends of the cylinder so that fluid pressure moves the carriage in both directions, means operable by motion of the carriage for effecting stopping and reversing of the carriage, and valve means operable by the motion of the carriage to partially block one of the feed lines and retard the speed of the piston and consequently the carriage as it approaches its termini of travel.

10. In a baking apparatus of the character described, an oven chamber having an inlet, a door for closing said inlet, a conveyer carriage movable through said inlet when the door is open to carry articles to be baked into the oven chamber, hydraulic means for opening and closing the door, hydraulic means for moving the carriage, a common source of fluid pressure for both said hydraulic means so that the response of both is controllable from a single point, and delayed action means interposed between the hydraulic means operating the carriage and the fluid source for positively delaying the response of the carriage actuating means until the door actuating means has functioned to open the door.

11. In a conveyer mechanism, the combination of parallel horizontal tracks, a carriage riding on said tracks adapted to carry articles from which acids and other liquids drip, fixed track supports, guide rods slidable vertically in said track supports for mounting the tracks for vertical motion, said guide rods being directly under the tracks, means for raising and lowering the tracks in unison, and said tracks being shaped so as to shed liquids dripping from the articles carried by the carriage to preclude such liquids from contacting the guide rods which mount the tracks.

12. In a conveyer mechanism, the combination of parallel horizontal tracks, a carriage riding on the tracks, fixed track supports, guide rods spaced along the length of the tracks slidable vertically in said fixed track supports and directly supporting the tracks, a plurality of medially pivoted levers each connected at one end to one of the guide rods, a prime mover for lifting and lowering the tracks, and linkage connecting the prime mover with the opposite ends of all of said levers to simultaneously actuate the levers for raising and lowering the tracks.

13. An apparatus for baking radiator cores comprising: a closed circulatory system for the circulation of hot gases, part of said circulatory system constituting a baking zone; means for supporting a radiator core to be baked crosswise in said baking zone so that the hot gases flow through the core between its fins and tubes; diffusing means in the baking zone ahead of the core support to diffuse the hot gases evenly over the entire area of the core; the baking zone and adjacent portion of the circulatory system beyond the core support being large and unobstructed so that the gases move freely through the baking zone without danger of localization of flow to insure uniform temperatures over the entire area of the core; and means ahead of the core support for closing off as much of the cross sectional area of the circulatory system as is not occupied by the core being baked so that all of the hot gases flowing through the system pass through the radiator core.

HANS S. MUNCH.
MARTIN G. BOERGER.